United States Patent [19] [11] Patent Number: 5,999,637
Toyoda et al. [45] Date of Patent: *Dec. 7, 1999

[54] INDIVIDUAL IDENTIFICATION APPARATUS FOR SELECTIVELY RECORDING A REFERENCE PATTERN BASED ON A CORRELATION WITH COMPARATIVE PATTERNS

[75] Inventors: Haruyoshi Toyoda; Yuuji Kobayashi; Naohisa Mukohzaka, all of Hamamatsu, Japan

[73] Assignee: Hamamatsu Photonics K.K., Shizuoka-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/719,700

[22] Filed: Sep. 27, 1996

[30] Foreign Application Priority Data

Sep. 28, 1995 [JP] Japan .................................... 7-251027

[51] Int. Cl.⁶ ........................................................ G06K 9/36
[52] U.S. Cl. .......................................... 382/124; 382/280
[58] Field of Search ...................................... 382/115, 117, 382/118, 124, 125, 127, 173, 191, 218, 278, 280, 119–123; 356/71; 340/825.34; 348/77

[56] References Cited

U.S. PATENT DOCUMENTS

| 4,752,966 | 6/1988 | Schiller ........................................ 382/5 |
| 5,042,073 | 8/1991 | Collot et al. ............................. 382/123 |
| 5,050,220 | 9/1991 | Marsh et al. ............................. 382/124 |
| 5,067,162 | 11/1991 | Driscoll, Jr. et al. .................... 382/126 |
| 5,163,094 | 11/1992 | Prokoski et al. ........................ 382/118 |
| 5,210,797 | 5/1993 | Usui et al. ................................ 382/4 |
| 5,291,560 | 3/1994 | Daugman ................................ 382/117 |
| 5,748,765 | 5/1998 | Takhar .................................... 382/124 |
| 5,761,330 | 6/1998 | Stoianov et al. ........................ 382/127 |
| 5,815,252 | 9/1998 | Price-Francis ............................ 356/71 |

FOREIGN PATENT DOCUMENTS

| 0329166 | 8/1989 | European Pat. Off. ......... G06K 9/68 |
| 63-149776 | 6/1988 | Japan ................................ G06K 9/00 |
| 5-746 | 1/1993 | Japan ............................. G06F 15/62 |
| 5-143634 | 6/1993 | Japan ........................... G06F 15/336 |
| WO 9108555 | 6/1991 | WIPO .............................. G07C 9/00 |

OTHER PUBLICATIONS

"Fingerprint Automatic Recognition Technique"; Measurement and Control; vol. 24, No. 8; Kawagoe; Aug., 1986; pp. 19–24.

"Optical Fingerprint Identification by Binary Joint Transform Correlation"; Fielding et al., Optical Engineering; vol. 30, No. 12; Dec. 1991; pp. 1958–1961.

(List continued on next page.)

Primary Examiner—Leo H. Boudreau
Assistant Examiner—Brian P. Werner
Attorney, Agent, or Firm—Sughrue, Mion, Zinn, Macpeak & Seas, PLLC

[57] ABSTRACT

The individual identification apparatus is provided for comparing a target pattern of an arbitrary person with a recorded reference pattern of a specific person, thereby judging whether the arbitrary person is the specific person. The apparatus has a calculation processing portion 60. In order to previously record a pattern of the specific person as a reference pattern, the portion 60 calculates correlations between the pattern of the specific person and comparative patterns which belong to other people. The portion 60 records the pattern of the specific person as a reference pattern only when the correlations between the pattern of the specific person and the comparative patterns are equal to or lower than a threshold. The portion 60 refuses to record, as a reference pattern, such a pattern that provides high correlations with regards to the other people's patterns and therefore that has a high similarity with regards to the other people's patterns. There is a small possibility that the apparatus will erroneously judge a match between an arbitrary person and the specific person when the arbitrary person is different from the specific person.

48 Claims, 12 Drawing Sheets

OTHER PUBLICATIONS

"Individual Identification Technique and Needs and Future of that Technique"; Hayashi; Measurement & Control; vol. 25, No. 8; 1986; pp. 1–5.

"Fourier Transform in Optical Computing", Yatagai; Institute of Applied Physics, University of Tsukuba; pp. 392(16)–399(23).

"Fingerprint Identification Apparatus System by Means of Optical Correlation"; Kobayashi et al.; Hamamatsu Photonics K.K. Central Researcy Laboratory; published at Image Sensing Symposium held on May 25, 1995; pp. 25–28.

"A Performance Evaluation of Biometric Identification Devices"; Holmes et al.; Sandia National Laboratories, Albuquerque, New Mexico, Feb. 1991; pp. 54–60.

"Supervised Adaption for Signature Verfication System", Anonymous, Jun. 1978; IBM Technical Disclosure Bulletin, vol. 21, No. 1, Jun. 1978, New York, US pp. 424–425 XP002050796.

"Reference Design Procedure for Signature Verification", Anonymous, Jun. 1978, IBM Technical Disclosure Bulletin, vol. 21, No. 1, Jun. 1978, New York, US, pp. 426–427, XP002050797.

INPUT FINGERPRINT    MASK₁ WITH ITS ONE BLOCK HAVING ZERO VALUE    PATTERN OF CORRESPONDING PART IS ERASED

FOURIER TRANSFORMED IMAGE OF FINGERPRINT PATTERN

MASK3 WITH RADIANT SECTIONS ONE OF WHICH HAS ZERO VALUE

PATTERN OF CORRESPONDING PART IS ERASED

FOURIER TRANSFORMED IMAGE OF FINGERPRINT PATTERN

MASK4

ZERO VALUE

ERASED PORTION

INDIVIDUAL IDENTIFICATION APPARATUS FOR SELECTIVELY RECORDING A REFERENCE PATTERN BASED ON A CORRELATION WITH COMPARATIVE PATTERNS

BACKGROUND OF THE INVENTION

1. Field of the Invention

The present invention relates to an individual identification apparatus for confirming identities of individuals by using a pattern recognition technique.

2. Description of the Related Art

Recently, confirmation of identities of individuals is required in order to manage entrance and exit of individuals in and out of restricted areas and to prevent free access to important equipment. An individual identification apparatus has been proposed to identify each individual under investigation with a specific individual on record. The person under investigation will be referred to as an "arbitrary individual" hereinafter. Fingerprints, face patterns, retinal vascular patterns, palm prints, voice patterns, and DNA patterns are unique for each individual. Accordingly, the individual identification apparatus is designed to previously record such a unique characteristic of a specific individual. When desiring to identify an arbitrary individual with the specific individual, the device picks up a corresponding characteristic of the arbitrary person. Then, the individual identification apparatus compares the picked up characteristic of the arbitrary person with the recorded characteristic of the specific person. This type of individual identification apparatus is described in "Individual Identification Technique and Needs and Future of That Technique" by Hayashi ("Measurement and Control," Vol 25, No.8, 1986.)

SUMMARY OF THE INVENTION

The above-described individual identification apparatus can be used to manage entrance and exit of individuals in and out of restricted areas and to prevent free access to safes, for example. It is ideal that the individual identification apparatus judge a match between identical persons at a rate of 100% and judge a match between different persons at a rate of 0%.

There has been proposed an individual identification apparatus of a type which is designed to previously record the characteristic of the specific person in a card and to optically produce a correlation between the characteristic of the specific person and a newly-picked up characteristic of the arbitrary person. Match or mismatch between the specific person and the arbitrary person is judged through comparing the correlation value with a certain threshold value.

It is noted that an autocorrelation is defined as a correlation between identical persons, and a cross-correlation is defined as a correlation between different persons. According to the individual identification apparatus, therefore, the autocorrelation is obtained as a correlation between the previously-recorded characteristic of the specific individual and the newly-picked up characteristic of the same person. The cross-correlation is obtained as a correlation between the previously-recorded characteristic of the specific individual and the newly-picked up characteristic of a person who is different from the specific individual.

It is noted, however, that there is a certain amount of correlation between the characteristics of different persons. On the other hand, the characteristic of each person varies in time and due to environmental changes. Therefore, it is impossible to completely separate an autocorrelation from a cross-correlation using the conventional individual identification apparatus. Accordingly, there is a possibility that the apparatus will erroneously Judge a match between different persons.

This induces the most serious problem when the individual identification apparatus is applied to a security system. For example, the individual identification apparatus can be applied in a bank to a security system for a special computer used for settling bills. Conventionally, a person in charge of the bill settlement has a key specially for enabling access to the computer. However, there are various problems relating to the management of the key. For example, the security will be broken when the key is lost or stolen. When the individual identification apparatus is applied to the computer, the computer is designed to previously record the characteristic of the specific person in charge of the bill settlement. When an arbitrary person desires to access the computer, the computer picks up a corresponding characteristic of the arbitrary person. The computer compares the picked-up characteristic of the arbitrary person with the recorded-characteristic of the specific person. After confirming a match between those persons, the computer is brought into a condition capable of performing a bill settlement. The thus-produced security system is free from troublesome key management.

It is noted, however, that the characteristic of each person has points similar to those in the characteristics of other persons. Further, it is necessary to take into account time-dependent changes in the characteristic of the single person. Accordingly, it is impossible to reduce the possibility of erroneously judging a match between different persons to a zero probability. It is therefore desirable to provide an improved individual identification apparatus which has a high recognition rate, that is, which has a lower possibility of erroneously judging a match between different persons.

The present invention is attained to satisfy the above-described demand and an object of the present invention is therefore to provide an improved individual identification apparatus with a high recognition ability.

In order to attain the above object and other objects, the present invention provides an individual identification apparatus for judging whether or not an arbitrary individual is a specific individual, the apparatus comprising: reference pattern storage judging means for calculating a correlation between a specific individual's reference characteristic pattern candidate, which is desired to be newly recorded as a reference pattern, and at least one comparative characteristic pattern of another person, thereby judging whether or not to record the reference characteristic pattern candidate as the reference pattern based on the calculated correlation; reference pattern storage means for recording the reference characteristic pattern candidate as the reference pattern only when the reference pattern storage judging means determines to record the reference characteristic pattern candidate; and comparing means for comparing a target characteristic pattern of an arbitrary individual with the reference pattern of the specific individual, thereby judging whether or not the arbitrary individual is the specific individual.

According to another aspect, the present invention provides an individual identification apparatus for determining whether or not an arbitrary individual is a specific individual, the apparatus comprising: reference candidate reception means for receiving a predetermined characteristic pattern of a specific individual as a reference pattern candidate; comparative pattern storage means for storing at least one corresponding characteristic pattern of at least one individual other than the specific individual as a comparative pattern; first correlation calculating means for calculating a correlation between the reference pattern candidate and the comparative pattern, thereby determining whether or not to record the reference pattern candidate as a reference pattern; reference storage means for storing the reference pattern candidate as a reference pattern only when the first correlation calculating means determines to record the reference pattern candidate; target reception means for receiving, as a target pattern, a corresponding characteristic pattern of an arbitrary individual desired to be identified as the specific individual; and second correlation calculating means for calculating a correlation between the target pattern and the reference pattern, thereby judging whether or not the arbitrary person is the specific individual.

According to still another aspect, the present invention provides an individual identification apparatus for judging whether or not an arbitrary individual is a specific individual, the apparatus comprising: correlation calculation means capable of calculating a correlation between two patterns; reference candidate reception means for receiving a predetermined characteristic pattern of a specific individual as a reference pattern candidate; reference storage judging means for controlling the correlation calculating means to calculate a correlation between the reference pattern candidate and a comparative pattern, thereby determining whether or not to record the reference pattern candidate, the comparative pattern including a corresponding characteristic pattern of an individual other than the specific individual; reference storage means for recording the reference pattern candidate as a reference pattern only when the reference storage judging means determines to record the reference pattern candidate; target reception means for receiving a target pattern which includes a corresponding characteristic pattern of an arbitrary individual desired to be identified as the specific individual; and identification Judging means for controlling the correlation calculating means to calculate a correlation between the target pattern and the reference pattern, thereby judging whether or not the arbitrary person is the specific individual.

According to a further aspect, the present invention provides a method of judging whether or not an arbitrary individual is a specific individual, the method comprising the steps of: receiving a predetermined characteristic pattern of a specific individual as a reference pattern candidate; calculating a correlation between the reference pattern candidate and a comparative pattern, thereby determining whether or not to record the reference pattern candidate, the comparative pattern including a corresponding characteristic pattern of an individual other than the specific individual; recording the reference pattern candidate as a reference pattern only when the reference storage judging means determines to record the reference pattern candidate; receiving a target pattern which includes a corresponding characteristic pattern of an arbitrary individual desired to be identified as the specific individual; and calculating a correlation between the target pattern and the reference pattern, thereby judging whether or not the arbitrary person is the specific individual.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENTS

Figure 1:
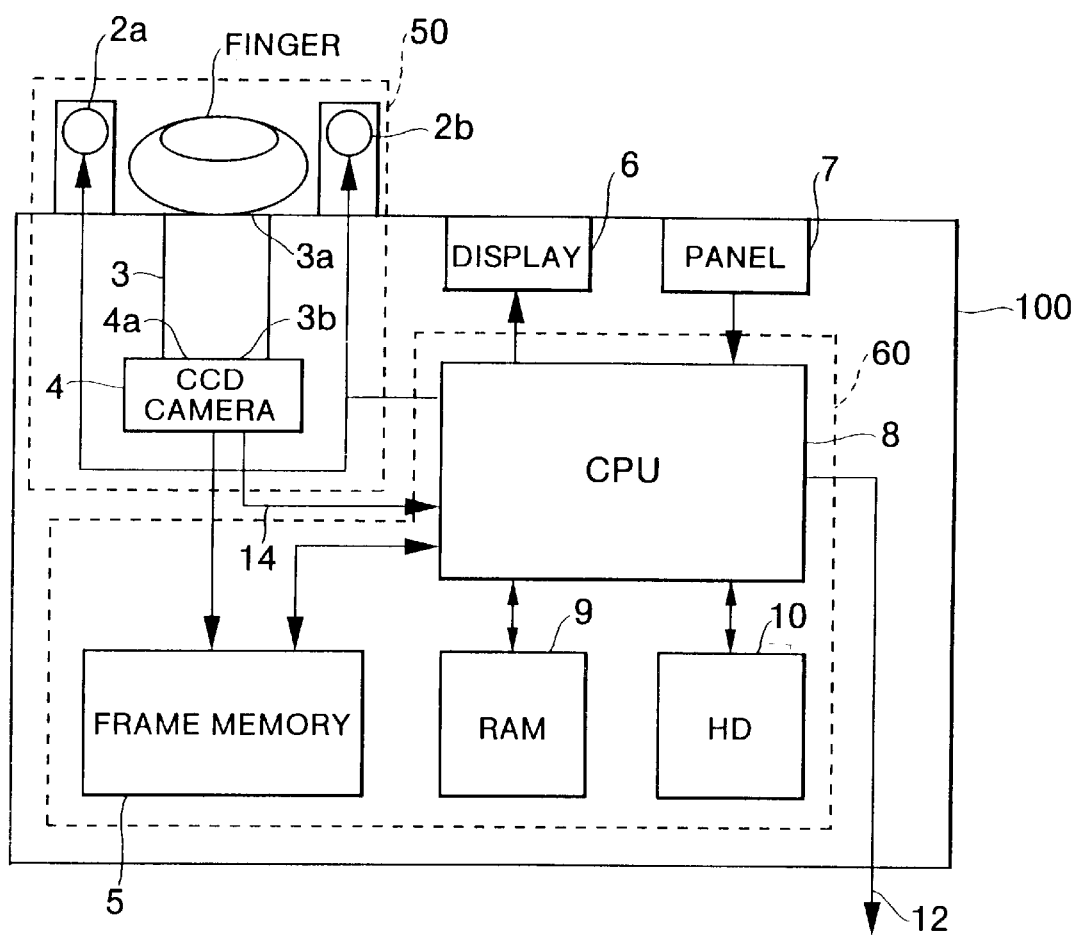
FIG. 1 shows a structure of a first embodiment of the individual identification apparatus of the present invention.

An individual identification apparatus according to preferred embodiments of the present invention will be described while referring to the accompanying drawings wherein like parts and components are designated by the same reference numerals to avoid duplicating description.

A first embodiment of the individual identification apparatus will be described below with reference to FIGS. 1 through 6(B).

The individual identification apparatus of the first embodiment is for recognizing identifications of individuals through comparing fingerprints (characteristic patterns) of the individuals. A fingerprint of a specific individual is previously recorded in the apparatus. When desiring to confirm whether or not an arbitrary person, in access to the present apparatus, is the specific person, the apparatus picks up a fingerprint of the arbitrary person. Then, the apparatus compares the newly-picked up fingerprint with the recorded fingerprint. Based on the compared result, the apparatus determines whether or not the arbitrary person is the specific person. It is noted that the apparatus of the present invention can use various unique characteristic patterns other than fingerprints. That is, the apparatus can use patterns such as face patterns, palm prints, retinal vascular patterns, Holmant patterns in voices, and the like.

FIG. 1 shows a structure of the individual identification apparatus 100 of the present embodiment. The apparatus 100 includes: an image pick up portion 50; a calculation processing portion 60; a display portion 6; and an operation panel 7. The image pick up portion 50 is for inputting a fingerprint of an individual who wants to record his/her fingerprint in the apparatus. (This person will be referred to as a "specific person," hereinafter.) The image pick up portion 50 is also for inputting a fingerprint of an individual under investigation who wants to be identified as the specific person. (This person will be referred to as an "arbitrary person," hereinafter.)

The calculation processing portion 60 is for judging whether the inputted specific person's fingerprint (referred to as a "reference fingerprint candidate") is appropriate for a reference fingerprint. Based on an affirmative judgement, the calculation processing portion 60 records therein the reference fingerprint candidate as a reference fingerprint. The calculation processing portion 60 is also for comparing the inputted arbitrary person's fingerprint (referred to as a "target fingerprint") with the reference fingerprint of the specific individual. Based on the comparison results, the calculation processing portion 60 determines whether the arbitrary person is the specific individual.

The display portion 6 is for showing a manual instruction and the judged results. The operation panel 7 includes several switches which an operator manipulates to control the apparatus 100. For example, the operation panel 7 includes a numerical pad for designating a personal identification number (ID). The operation panel 7 also includes a mode setting key for setting one of a reference fingerprint storage mode and an individual identification mode. The image pick up portion 50 includes: a pair of light emission diodes (LEDs) 2a and 2b, a fiber optical plate (FOP) 3, and an charge-coupled device (CCD) camera 4. The calculation processing portion 60 includes: a frame memory 5, a CPU 8, a random access memory (RAM) 9, and a hard disk (HD) 10. The display portion 6 can be constructed from a liquid crystal display, an LED display, or the like.

The structure of the image pick up portion 50 will be described below. The pair of LEDs 2a and 2b are light emitting elements for irradiating with light a finger of an individual to pick up his/her fingerprint. The FOP 3 is an integrated bundle of a plurality of optical fibers. The FOP 3 has opposite end surfaces, that is, an input end surface 3a and an output end surface 3b along the longitudinal directions of the optical fibers. The finger of the individual is placed on the input end surface 3a. The output end surface 3b is disposed in contact with a light receiving surface 4a of the CCD camera 4. The FOP 3 transmits the fingerprint from the input end surface 3a to the output end surface 3b. The CCD camera 4 is a two-dimensional image pick up element for picking up the fingerprint outputted from the output and surface.

The structure of the calculation processing portion 60 will be described below. The frame memory 5, connected to the CCD camera 4, serves as an image storage device for receiving image signals outputted from the CCD camera 4, for digitizing the image (video) signals, and for storing the digitized image signals. During the reference fingerprint storage process, the frame memory 5 is inputted with image signals Indicative of a reference fingerprint candidate picked up from a specific person. The CPU 8 performs a reference fingerprint recordation or storage process, as will be described later, to determine whether the reference fingerprint candidate is appropriate for being stored as a reference fingerprint. During the individual identification mode, on the other hand, the frame memory 5 is inputted with image signals indicative of a target fingerprint picked up from an arbitrary person. The CPU 8 performs an individual identification process, as will also be described later, to confirm whether or not the arbitrary person is the specific person. That is, the CPU 8 performs comparing calculations onto the image signals stored in the frame memory 5 to produce a correlation value between the target fingerprint and the reference fingerprint. Based on the magnitude of the obtained correlation value, the CPU 8 determines whether the arbitrary person is the specific person. The CPU 8 is further for receiving instruction signals inputted from the operation panel 7 and for driving the LEDs 2a and 2b and controlling the display 6 to show the determined results.

The RAM 9 and the HD 10 are for storing: the reference fingerprint of the specific Individual; an identification number indicative of the specific individual; and judgement results. The HD 10 previously stores a plurality of comparative fingerprints which are used during the reference fingerprint storage process. The comparative fingerprints include six hundred fingerprints obtained from randomly-selected six hundred people. The HD 10 also previously stores various programs such as a program for performing the reference fingerprint storage process and a program for performing the individual identification process.

Figure 2:
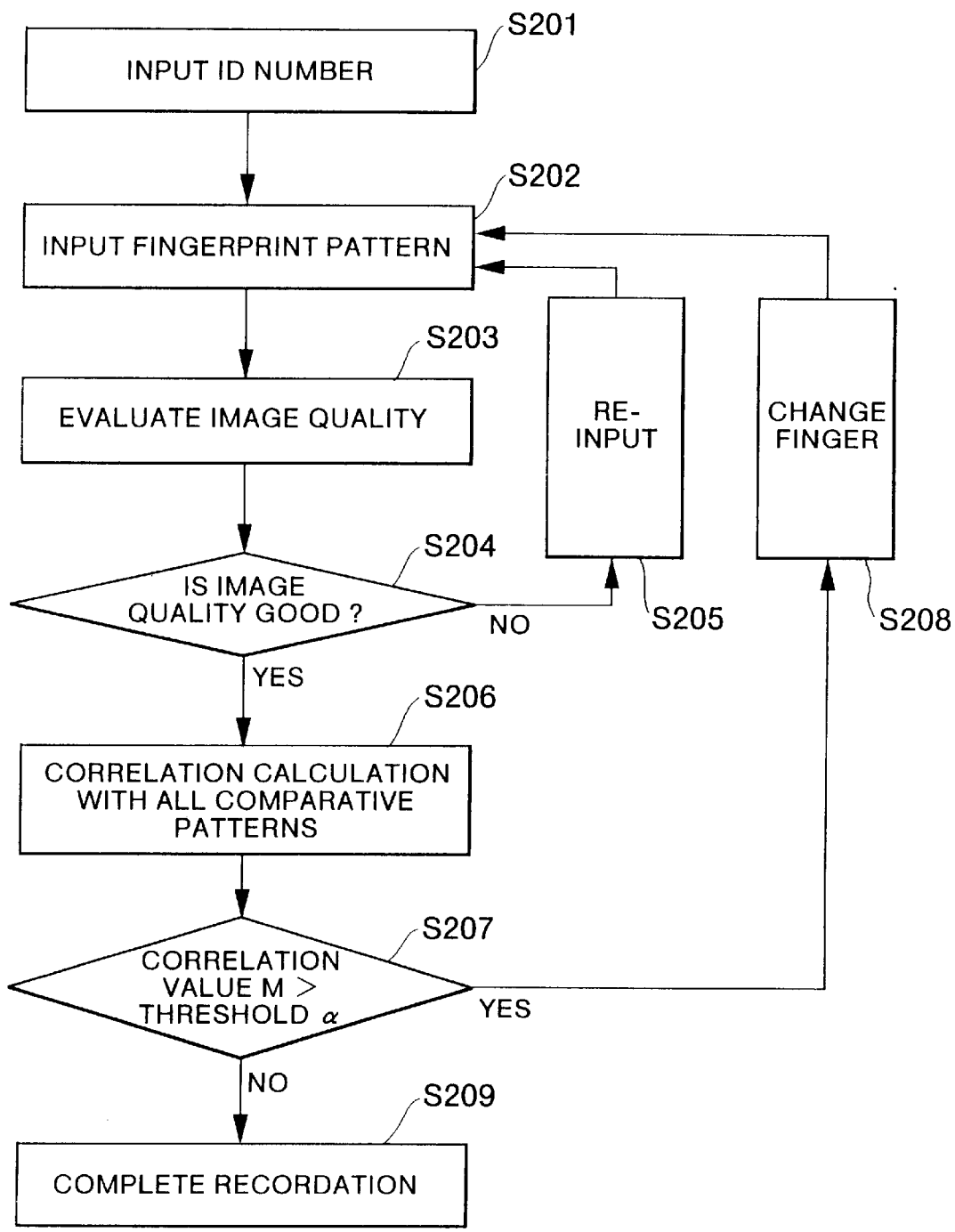
FIG. 2 is a flowchart of a reference fingerprint recordation process achieved by the individual identification apparatus of FIG. 1.

According to the apparatus 100 with the above-described structure, a fingerprint of a specific individual is previously stored in the apparatus 100 through the reference fingerprint storage process. FIG. 2 shows the reference fingerprint storage process. When an arbitrary person desires to be identified as the specific individual, the individual identification process (recognition process) is conducted as shown in FIG. 5(A).

With referring to FIG. 2, the reference fingerprint storage process will be described below.

When a specific individual desires to newly record his/her fingerprint in the apparatus 100, the specific individual manipulates the mode setting key on the panel 7 to designate the reference fingerprint storage mode. As a result, the CPU 8 starts performing the reference fingerprint storage process of FIG. 2. During this process, the specific individual first manipulates in S201 the numeric pad in the operation panel 7 to designate his/her own identification number. As a result, the LEDs 2a and 2b are turned ON, and the CCD camera 4 is turned ON. The display portion 6 is controlled to show a finger, such as a thumb, an index finger, or the like, which has to be recorded in the apparatus 100. The specific individual then pushes down his/her finger of the instructed kind on the input end surface 3a as shown in FIG. 1. As a result, a fingerprint of the specific individual is picked up in S202. That is, a fingerprint of the specific individual is formed on the output end surface 3b of the FOP 3. The fingerprint is picked up by the CCD camera 4. The CCD camera 4 outputs, to the frame memory 5, video signals indicative of the specific individuals fingerprint. The CCD camera 4 also outputs a monitor signal 14 indicative of a total intensity of the fingerprint. The CCD camera 4 applies the monitor signal 14 to the CPU 8.

In S203, the CPU 8 compares the total intensity of the fingerprint with a predetermined standard intensity. The CPU 8 determines, in S204, that the fingerprint is properly picked up only when the total intensity of the fingerprint exceeds the standard intensity. In S204, the CPU 8 also judges a quality of the fingerprint based on the monitor signal 14. That is, the CPU 8 judges whether or not the fingerprint has a sufficiently high brightness, a sufficiently large size, and the like. For example, the CPU 8 judges whether or not the fingerprint is stable. The CPU 8 determines that the fingerprint is stable when the CCD's picked-up total intensity 14 remains higher than the standard value for a predetermined time period or more. When the CPU 8 determines that the quality of the fingerprint is insufficient, the CPU 8 controls in S205 the display portion 6 to show corresponding instruction comments. For example, the display portion 6 shows that "the inputted fingerprint is too thin," "the inputted fingerprint is too small," and "the inputted fingerprint is incorrectly positioned." The specific person then again tries to input his/her fingerprint according to the instructions.

On the other hand, when the thus picked-up fingerprint has a sufficiently high quality, the CPU 8 instructs in S206 the frame memory 5 to receive the fingerprint video signals as a reference fingerprint candidate. Then, the CPU 8 compares the reference fingerprint candidate with a plurality of comparative fingerprints which are stored in the HD 10. As described already, the comparative fingerprints include six hundred fingerprints of randomly-selected six hundred people. In this example, the comparison calculation achieved in S206 employs a correlation calculation which is high in speed and which can properly separate the autocorrelation from the cross-correlation.

A correlation degree, cr(u, v), between the reference fingerprint candidate g(x, y) and each comparative fingerprint f(x, y) can be represented by the following formula (1):

$$Cr(u, v) = \int_{-\infty}^{\infty}\int_{-\infty}^{\infty} [f(x-u, y-v)g(x, y)]dx dy \quad (1)$$

A correlation value is defined as a maximum intensity of the correlation output indicated by or(u, v). This correlation value is free from positional shift between the reference fingerprint candidate and the comparative fingerprint. The above-described correlation calculation is described in "Fourier Transform Employed in Optical Information Processings" by Yatagai ("Optics," Vol. 21, No.6).

The above-described correlation calculation (1) can be rewritten by two stages of Fourier transform operation as shown below.

$$cr(u, v) = IF[F\{f(x, y)\} \cdot F^*\{g(x, y)\}] \quad (2)$$

where IF, F indicate inverse Fourier transformation and Fourier transformation, respectively. The "$F^*\{g\}$" indicates a phase term of a conjugate of "$F\{g\}$."

Figure 3:
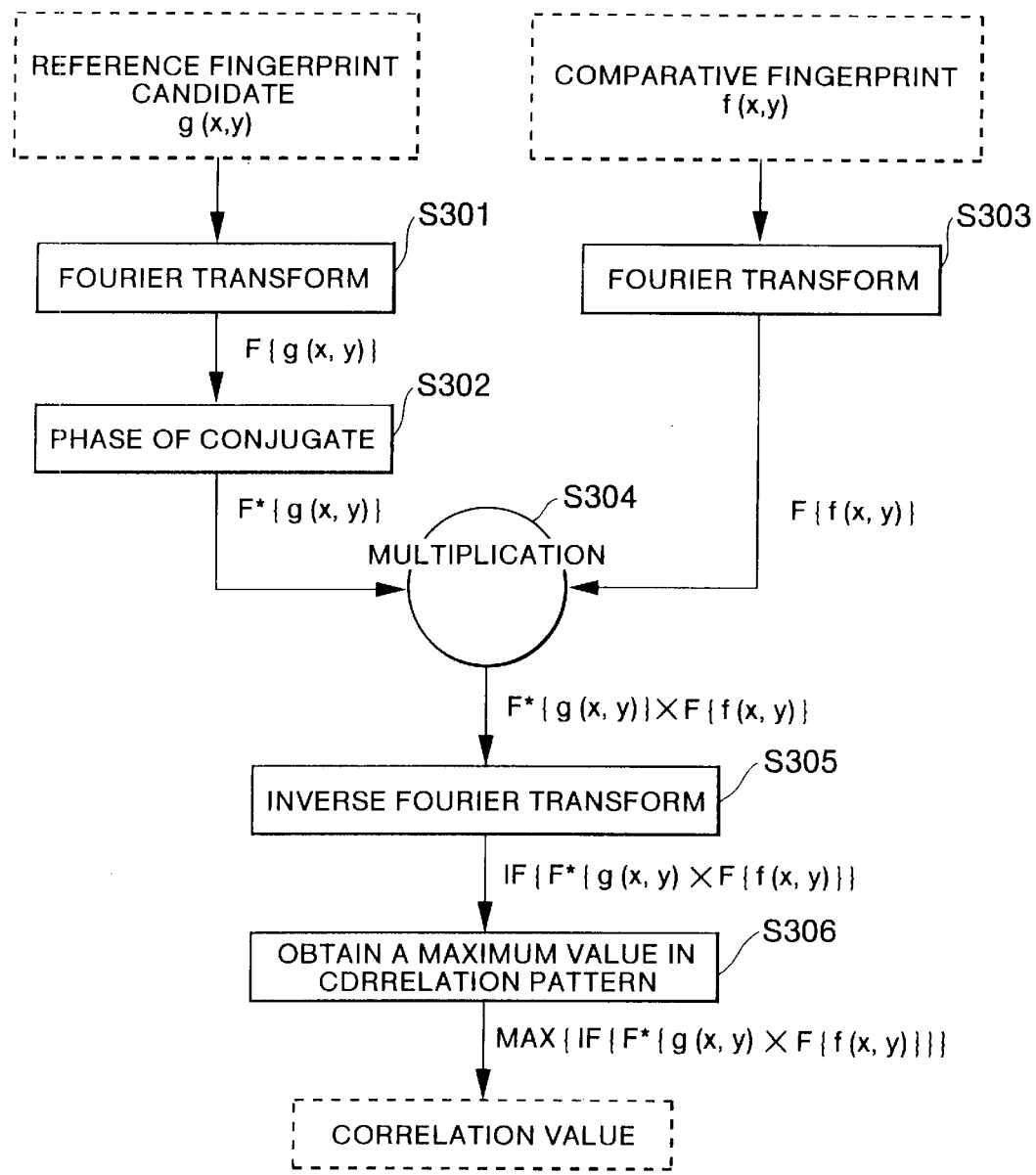
FIG. 3 illustrates a correlation calculation employed in the recordation process of FIG. 2.
Figure 4:
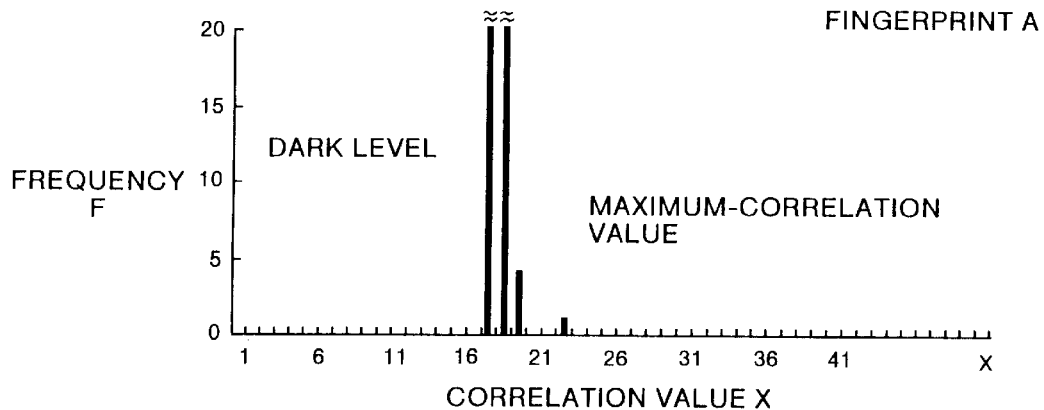
FIG. 4(A) shows an examination result of correlation values obtained between one fingerprint A randomly selected from five hundred fingerprints under investigation and 499 other fingerprints.
FIG. 4(B) shows an examination result of correlation values obtained between one fingerprint B randomly selected from five hundred fingerprints under investigation and 499 other fingerprints.
FIG. 4(C) shows an examination result of correlation values obtained between one fingerprint C randomly selected from five hundred fingerprints under investigation and 499 other fingerprints.
Figure 4:
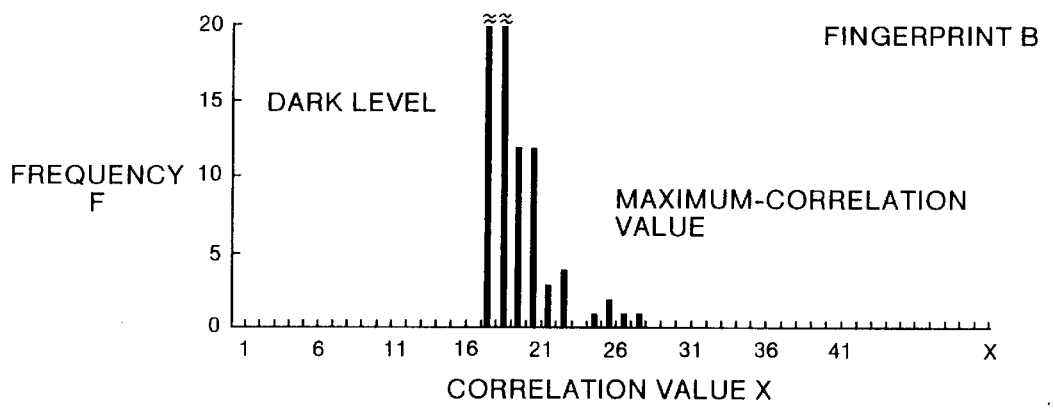
Figure 4:
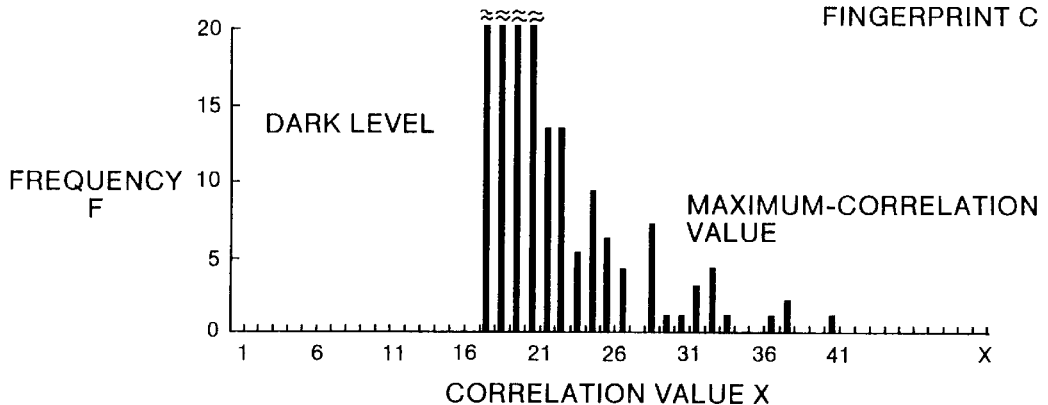
Figure 5:
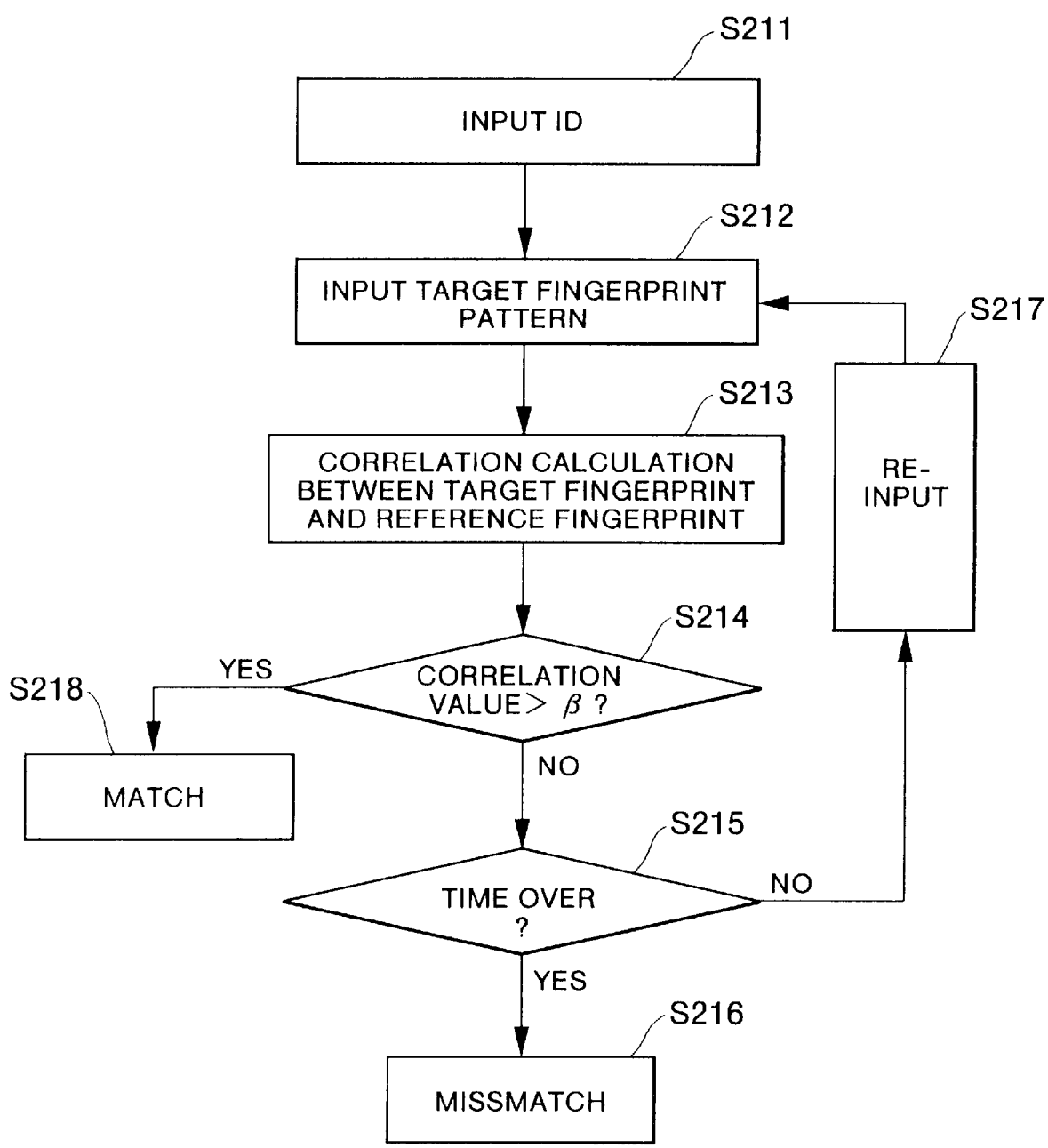
FIG. 5(A) shows a flowchart of an individual identification process achieved by the individual identification apparatus of FIG. 1.
FIG. 5(B) illustrates a correlation calculation employed in the individual identification process of FIG. 5(A)
Figure 5:
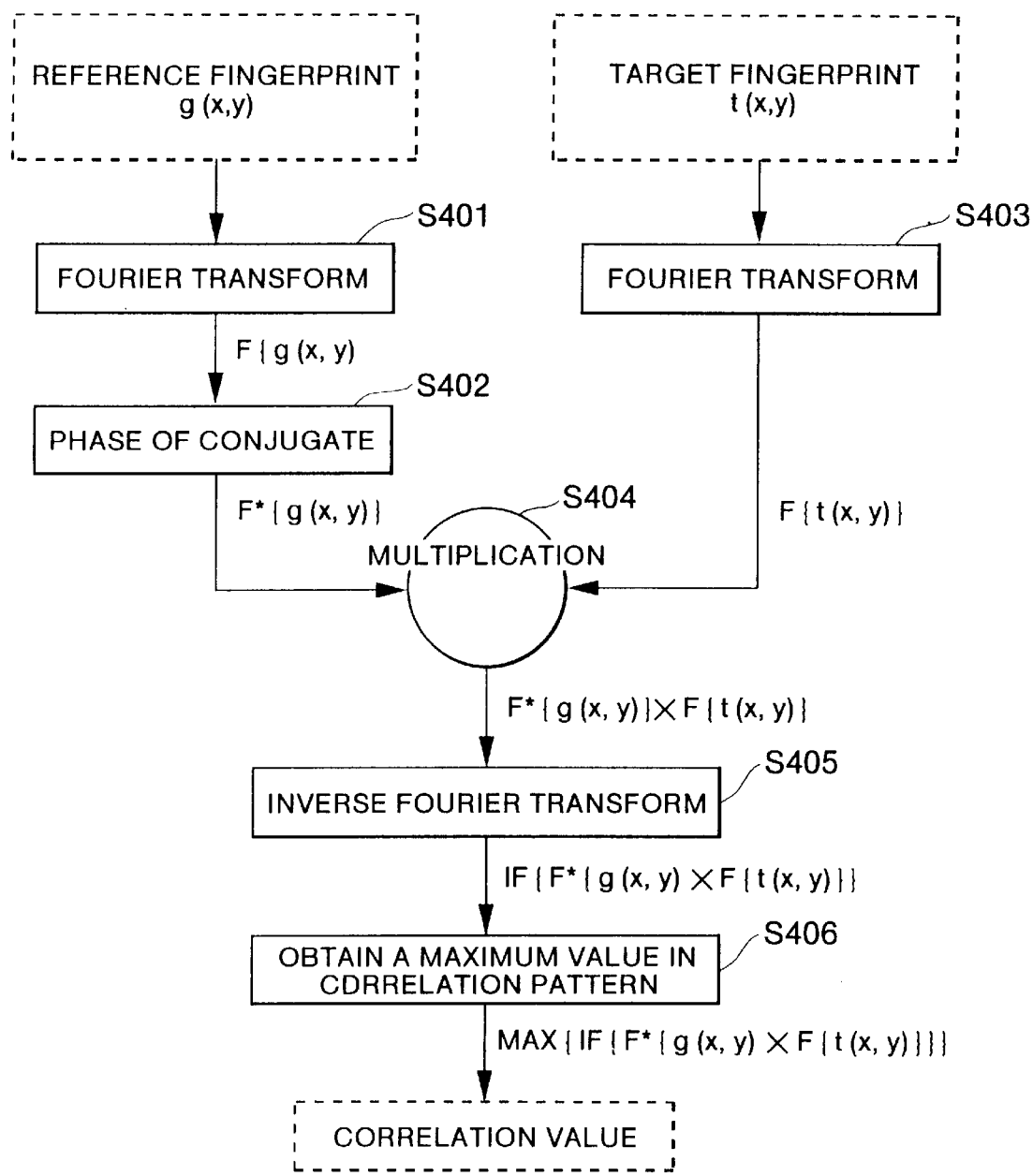
Figure 6:
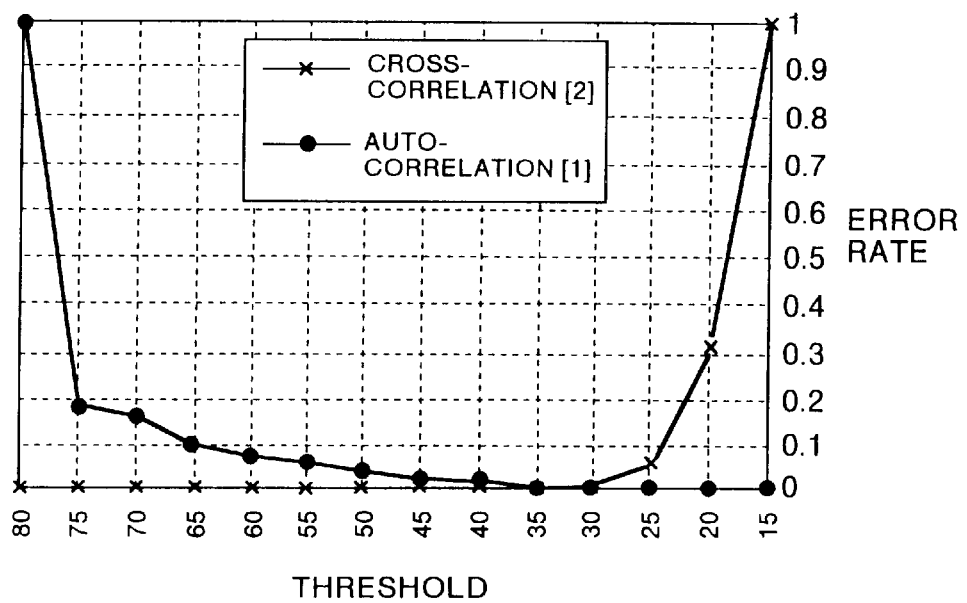
FIG. 6(A) shows examination results of error recognition rates at which a conventional individual identification apparatus recognized fingerprints of 600 individuals.
FIG. 6(B) shows an essential part of the examination results of the error recognition rates in a logarithm expression.
Figure 6:
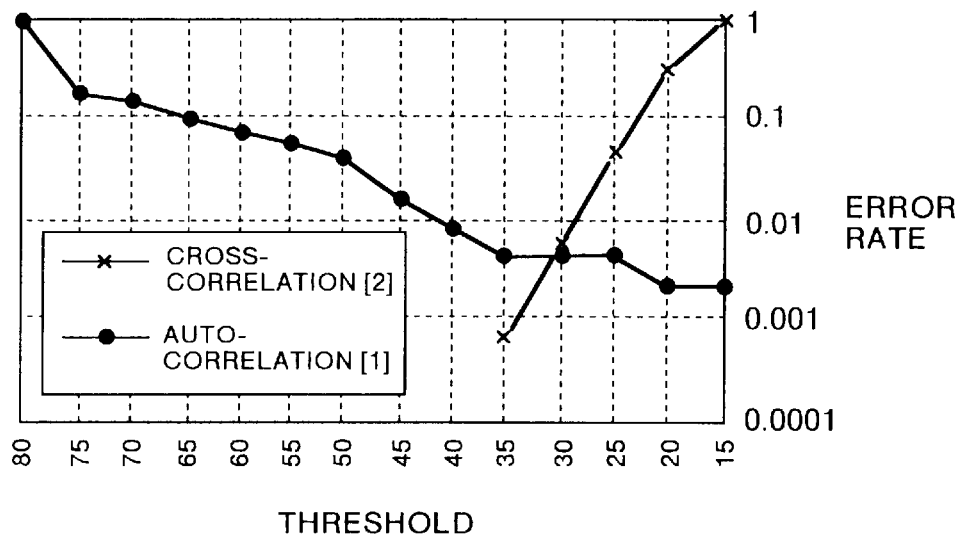

In view of the above, the correlation calculation of S206 is performed as shown in FIG. 3. That is, the reference fingerprint candidate g(x, y) is first Fourier transformed into $F\{g(x, y)\}$ in S301. Then, in S302, a conjugate of the Fourier transform is obtained, and a phase term of the conjugate, $F^*\{g(x, y)\}$, is obtained. Similarly, in S303, one comparative fingerprint f(x, y) is retrieved from the HD 10 and Fourier transformed into $F\{f(x, y)\}$. Then, in S304, those images $F^*\{g(x, y)\}$ and $F\{f(x, y)\}$ are multiplied. The product is inverse Fourier transformed in S305, As a result, a correlation pattern is obtained. Then, a maximum value of the correlation pattern is calculated as a correlation value C in S306.

During the above-described course of processes S301–S306, the correlation value C is obtained between the reference fingerprint candidate g (x, y) and the retrieved one comparative fingerprint f (x, y). This course of processes S301–S306 is repeatedly performed for the reference fingerprint candidate g(x, y) and the six hundred comparative fingerprints f (x, y).

Thus, the CPU 8 obtains in S206 six hundred correlation values C between the one reference fingerprint candidate and the six hundred comparative fingerprints. Then, the CPU 8 determines a maximum value M of the six hundred correlation values C. Then, in S207, the CPU 8 compares the maximum correlation value M with a predetermined cross-correlation acceptable value (which will be referred to as a threshold α hereinafter.)

The individual identification apparatus of the present embodiment employs this correlation comparison steps in S206 and S207 for the reasons set forth below.

The present inventors performed investigations on fingerprints. The investigation results show that individuals have two types of fingerprints: a first type showing a high cross-correlation with a number of other people's fingerprints: and a second type showing a low cross-correlation with most other people's fingerprints. In other words, the first type of fingerprint has characteristics common with a number of other people's fingerprints. The second type of fingerprints are unusually formed and so do not have characteristics in common with those of other people's fingerprints. The same person can have first type of fingerprints on one or more fingers and second type fingerprints on the remaining finger.

FIGS. 4(A) through 4(C) are cross-correlation value histograms for three different fingerprints A, B, and C which were randomly selected from five hundred fingerprints under investigation. FIG. 4(A) is a histogram showing how cross-correlations, between the fingerprint A and other 499 fingerprints, are distributed. FIG. 4(B) is a histogram showing how cross-correlations, between the fingerprint B and other 499 fingerprints, are distributed. FIG. 4(C) is a histogram showing how cross-correlations, between the fingerprint C and other 499 fingerprints, are distributed. In each graph, a horizontal axis denotes correlation values "x", and a vertical axis denotes a frequency "F" at which the corresponding correlation values "x" are obtained. It is noted that a frequency value F(x) is defined as the total frequency at which correlation values x that satisfy the following inequality are obtained:

$$n \leq x < n+1,$$

where "n" is an integer equal to or higher than 0.

A correlation detector (CCD detector) used in these investigations was designed so as to be capable of outputting a correlation value of 255 at maximum. The dark level of the correlation detector appeared at the correlation value of 18 in each graph and presented a highest frequency level.

As apparent from FIGS. 4(A)–4(C), though the fingerprint A presented a maximum cross-correlation value of 23, the fingerprint C presented a maximum cross-correlation value of 41. Thus, distribution in the correlation values are widely changed in accordance with the respective fingerprints. Because the fingerprint C has many points similar to those of other people's fingerprints, the fingerprint C is inappropriate as a reference fingerprint for discriminating the person having the fingerprint C from other people. Contrarily, the fingerprint A has the smallest number of points similar to those of other people's fingerprints, and therefore is most appropriate as a reference fingerprint for discriminating a person having the is fingerprint A from other people.

In view of the above-described investigation results, the comparison processes of S206 and S207 are provided according to the present invention. In other words, the comparison processes are provided in order not to record such a fingerprint C as presents a high cross-correlation with regards to other people's fingerprints. In the process of S206, the reference fingerprint candidate is compared with the six hundred comparative fingerprints, that is, six hundred fingerprints of other people. When the maximum value M, of the six hundred correlation values C, between the reference fingerprint candidate and the six hundred comparative fingerprints, exceeds the threshold α, then the CPU 8 determines that this reference fingerprint candidate is highly similar to other people's fingerprints, and therefore is inappropriate for a reference fingerprint. The CPU 8 therefore refuses to record the reference fingerprint candidate.

In this case, the CPU 8 controls in S208 the display portion 6 to show an instruction that the specific person should change his/her finger for inputting a reference fingerprint. For example, the CPU 8 controls the display portion 6 to show "the inputted fingerprint is inappropriate for recordation," "use another finger," and the like. After reviewing this instruction, the specific individual retries to input another fingerprint in S202.

On the other hand, when the maximum value M of the correlation values C is equal to or lower than the threshold α, the CPU 8 determines that the reference fingerprint candidate is not similar to the other people's fingerprints and therefore is appropriate for a reference fingerprint. The CPU 8 therefore records in S209 the reference fingerprint candidate into the RAM 9 and the HD 10 as a reference fingerprint. Each of the RAM 9 and the HD 10 stores the reference fingerprint together with the already-inputted identification number. Thus, a recordation of the specific individual's fingerprint is completed. The CPU 8 controls the display portion 6 to show that the recordation is completed.

In the above description, the CPU B compares, with the threshold α, the maximum value M of all the correlation values C. However, the reference fingerprint storage program may be designed to perform this comparing operation without calculating the maximum value M but in the following manner (1), (2), or the like.

(1) The correlation values C between the reference fingerprint candidate and the comparative fingerprints are compared one by one with the threshold α. The recordation of the reference fingerprint candidate is rejected when one correlation value C appears exceeding the threshold α.

(2) All the correlation values C are compared with the threshold α. The number of correlation values C that exceed the threshold α is counted. The recordation of the candidate is rejected when the counted number exceeds a predetermined number.

The specific person may store one or more auxiliary reference fingerprints in addition to the reference fingerprint. The auxiliary reference fingerprints will be used when the specific person injures or otherwise changes a finger to be used during the individual identification process. Also in order to record the auxiliary reference fingerprints, the CPU 8 may calculate correlation values between the auxiliary fingerprints and the comparative fingerprints. The CPU 8 may compare the correlation values or their maximum values with the threshold α in the same manner as described above. The CPU 8 may use the compared results to determine whether the auxiliary reference fingerprints can be recorded.

Next, the individual identification process achieved by the apparatus 100 will be described with reference to FIG. 5(A).

An arbitrary person, who wants to be identified as the specific individual, manipulates the mode setting key on the panel 7 to designate the individual identification mode. As a result, the CPU 8 starts performing the individual identification process of FIG. 5(A). During this process, the arbitrary person first inputs the identification number of the specific individual in S211. The CPU 8 retrieves, from the RAM 9 or the HD 10, a reference fingerprint which is recorded in correspondence with the inputted identification number. The CPU 8 controls the display 6 to show a kind of the retrieved fingerprint, such as an index finger, a thumb, or the like. The arbitrary person pushes down his/her finger of the instructed kind onto the input end surface of the POP 3. Then, in S212, the arbitrary person's fingerprint (a target fingerprint) is picked up by the CCD camera 4, and transferred to the frame memory 5.

Next, the CPU 8 performs a comparison calculation in S213 to compare the presently-picked up target fingerprint with the retrieved reference fingerprint. The CPU 8 performs the correlation operation in S213 as shown in FIG. 5(B). That is, the reference fingerprint $g(x, y)$ is first Fourier transformed into $F\{g(x, y)\}$ in S401. Then, in S402, a conjugate of the Fourier transform is obtained, and a phase term of the conjugate, $F^*\{g(x, y)\}$, is obtained. Similarly, in S403, the target fingerprint $t(x, y)$ is Fourier transformed into $F\{t(x, y)\}$. Then, in S404, those images $F^*\{g(x, y)\}$ and $F\{t(x, y)\}$ are multiplied. The product is inverse Fourier transformed in S405. As a result, a correlation pattern is obtained. Then, a maximum value of the correlation pattern is calculated as a correlation value in S406.

Then, the CPU 8 compares in S214 the obtained correlation value with a predetermined threshold β. When the correlation value is equal to or lower than the threshold β, the CPU 8 compares in S215 the number of already-performed trial processes with a predetermined limit number. It is noted that one trial process is defined in the series of steps of S212 through S214. When the number of the already-performed trials is equal to or lower than the predetermined limit number, the CPU 8 controls in S217 the display 6 to instruct the arbitrary person to retry to input his/her fingerprint. After reviewing the instruction, the arbitrary person will again input his/her fingerprint in S212. As a result, a subsequent trial is performed through S212 through S214.

On the other hand, when the number of the already-performed trials exceeds the limit number, the CPU 8 determines that time is over and therefore determines in S216 that the arbitrary person is different from the specific individual. The CPU 8 then controls the display 6 to show that the arbitrary person is not the specific individual. The CPU a may sound a buzzer (not shown) before finalizing the program.

Similarly at a cash dispenser machine employed in banks, when the above-described series of steps S211–S216 is conducted three successive times for the single inputted identification number and when each ends with a negative result, the CPU 8 may stop using the reference fingerprint which is recorded in correspondence with that identification number. When one or more auxiliary reference fingerprints are recorded in correspondence with the identification number, the CPU may replace the reference fingerprint with the auxiliary reference fingerprint. A system manager of the apparatus 100 may perform various processes following such a negative judgement. For example, the system manager may request the specific person to again record his/her fingerprint to renew the reference fingerprints On the other hand, when the correlation value exceeds the threshold β, the CPU 8 determines in S218 that the arbitrary person is the specific individual. The CPU 8 outputs a match recognition signal 12 to an external device which is connected to the present device 100. For example, the external device is an electromagnetic-locked door. The match recognition signal 12 serves as a lock release signal for causing the electromagnetic look to open. When the external device is a usage-management device for important equipment, the match recognition signal 12 serves as a usage allowance signal for setting the equipment into a condition usable by the arbitrary person. Thus, the individual identification process is completed.

In the present embodiment, the reference fingerprint is recorded in each of the RAM and HD as it is. The reference fingerprint is therefore Fourier transformed in S401 during the individual identification process. However, the reference fingerprint storage program of FIG. 2 may be designed to Fourier transform the reference fingerprint and then to store the Fourier transformed fingerprint (reference filter) into the RAM 9 and the HD 10 in S209. In this case, the CPU 8 will not need to Fourier transform the reference fingerprint during the individual identification process. In other words, the step S401 may be omitted from the individual identification process.

As described above, the individual identification apparatus 100 of the present embodiment refuses to record a fingerprint which presents a high correlation in regards to the comparative fingerprints, that is, which presents high similarity to other people's fingerprints. The apparatus 100 records, as reference fingerprints, only those fingerprints that have a low correlation with regards to all the comparative fingerprints. Accordingly, even when the threshold β is set to a value equal to a conventionally-used threshold, it is still possible to reduce the probability of erroneously identifying, as the specific person, an arbitrary person who is different from the specific person. In other words, it is possible to decrease a false acceptance error rate for erroneously -judging a match between different persons. It is noted that by setting the threshold β to a value less than the conventionally-used threshold, it is possible to reduce the probability of an erroneous rejection when the arbitrary person is the specific person. In other words, it is possible to decrease a false rejection error rate for erroneously judging a mismatch between identical persons. According to the present invention, still in this case, it is possible to decrease or at least to prevent an increase in the false acceptance error rate.

This advantage of the present invention will be apparent from results of investigations which were performed by the present inventors with using a conventional individual identification apparatus. The investigations will be described below.

The present inventors investigated recognition error rates, at which the conventional individual identification apparatus identified nix hundred individuals through subjecting their fingerprints to a conventional correlation calculation. FIG. 6(A) shows the investigation results, and FIG. 6(B) enlarges an essential part of FIG. 6(A). FIG. 6(B) shows the recognition error rates in a logarithm expression.

During the investigations, the present inventors examined two types of error recognition rates: [1] the false rejection error rate, that is, the probability of erroneously judging a mismatch between identical persons; and [2] the false acceptance error rate, that is, the probability of erroneously judging a match between different persons. In order to examine the false rejection error rate [1], one person was caused to input four times a fingerprint of his/her own one finger. Out of the thus obtained four fingerprints, the most stable fingerprint was recorded as a reference fingerprint. Then, autocorrelations between the reference fingerprint and the remaining three fingerprints were calculated. As a result, three correlation values were obtained. Then, a maximum value of the three correlation values was calculated. The maximum value was then compared with a predetermined threshold. When the maximum value was higher than the threshold, the conventional individual identification apparatus properly judged that the three fingerprints belong to the person who has the reference fingerprint. On the other hand, when the maximum value was equal to or lower than the threshold, the apparatus erroneously judged that the three fingerprints belong to a person who is different from the person who has the reference fingerprint. Based on this theory, the present inventors controlled the conventional individual identification apparatus to perform the above-described correlation calculation for six hundred Individuals. The present inventors then counted the number of individuals, for whom the maximum autocorrelation values became equal to or lower than the threshold. Thus, the present inventors obtained the false rejection error rate [1]. This error rate ErrACP is represented by the following formula (3):

$$ErrACP = \frac{\int_0^{th} ACP(x)dx}{n} \quad (3)$$

where "x" is a correlation value (correlation calculation result), "ACP(x)" is a frequency at which the correlation value "x" appeared, "th" is a threshold value set in the apparatus, and "n" is the total number (600, in this example) of individuals under investigation. The false rejection error rate [1] was calculated for the threshold being changed to various values. Curves indicated by "Autocorrelation" in FIGS. 6(A) and 6(B) show the false rejection error rate [1] obtained for the various threshold values.

In order to examine the false acceptance error rate [2], on the other hand, the present Inventors controlled the conventional individual identification apparatus to perform correlation calculations on two different persons several times and to obtain several correlation values. Then, the present inventors controlled the apparatus to calculate the maximum value of the correlation values. The apparatus compared the maximum correlation value with the threshold value. When the maximum correlation value was higher than the threshold, the apparatus erroneously judged that the two different persons were identical. The present inventors controlled the apparatus to perform this correlation calculations on 600×599 couples of different persons. The present inventors counted the number of correlation maximum values that exceeded the threshold, thereby calculating the false acceptance error rate [2]. The false acceptance error rate ErrCCP is represented by the following formula (4):

$$ErrCCP = \frac{\int_{th}^{\infty} CCP(x)dx}{n(n-1)} \quad (4)$$

where "x" is a correlation value (correlation calculation result), "CCP(x)" is a frequency at which the correlation value "x" appeared, "th" is the threshold value set in the apparatus, and "n" is the total number (600, in 20 this example) of individuals under investigation. The rate [2] was also calculated when the threshold was changed to various values. Curves indicated by "cross-correlation" in FIGS. 6(A) and 6(B) show the false acceptance error rate [2] obtained for the various threshold values.

It is noted that details of the above-described investigations are disclosed in "Fingerprint Identification Apparatus System by means of Optical Correlation" published at Image Sensing Symposium held on May 25, 1995.

As apparent from FIGS. 6(A) and 6(B), the false rejection error rate [1] and the false acceptance error rate [2] vary inversely in accordance with change in the threshold value. In more concrete terms, the false rejection rate [1] decreases as the threshold decreases, but the false acceptance error rate [2] increases as the threshold decreases. The cross over point where the curves indicative of the rates [1] and [2] are equal is 0.002. Accordingly, when the threshold is set to a value that causes both the rates [1] and [2] to have the value of 0.002, it is possible to properly judge a mismatch between different persons at a probability of 99.8% and to properly judge a match between identical persons also at a probability of about 99.8%. When the threshold is set to a higher value, the false acceptance error rate [2] will decrease but the false rejection error rate [1] will increase.

The above-described phenomenon was obtained not only for fingerprints but also for other various biometric characteristics of individuals. "A Performance Evolution of Biometric Identification Device" (Sandia National Laboratories Journal, 1991, page 59) discloses a graph representing an investigation result of recognition error rates, at which a conventional palm print recognition device (distributed by Yamaya Systems in Japan) recognized individual palm prints. A vertical axis in the graph shows the error recognition rates. The device presented good ability when the error recognition rates decreased to zero. The horizontal axis corresponds to a threshold set in the apparatus. The error recognition rates changed according to the threshold value. Also in this examination results, the error recognition rates were evaluated for both the false rejection error rate and the false acceptance error rate. The examination results also show the tendency that the false rejection error rate decreases as the threshold decreases. The false acceptance error rate increases as the threshold decreases.

In view of the above-described investigation results, the individual identification apparatus of the present invention is provided to refuse to record, as a reference fingerprint, a fingerprint which has high similarity in regards to other people's fingerprints. Accordingly, it is possible to reduce the false acceptance error rate from the level [2] of FIG. 6(A) entirely over the threshold value range in the graph. It therefore becomes possible to decrease the threshold $\beta$ used in the individual identification process in order to decrease the false rejection error rate. Still in this case, the false acceptance error rate is lower than or equal to, at maximum, that obtained in the conventional individual identification apparatus. The apparatus of the present embodiment can therefore attain an improved recognition ability.

It is noted that investigations similar to those described above may preferably be achieved with the apparatus 100 of the present embodiment to obtain the recognition error rate graph for the apparatus 100. Thus obtained graph will indicate the false rejection error rate and the false acceptance error rate. The threshold $\beta$ used for identifying individuals may be set according to the thus obtained recognition error rate graphs. That is, the threshold $\beta$ may be set according to a required false rejection error rate and a required false acceptance error rate. The threshold $\alpha$ used for recording reference fingerprints may be set equal to or lower than the threshold $\beta$. It is noted, however, that the specific person will have to try to input his/her fingerprint many times when the threshold $\beta$ is set to a too low value.

It is conceivable that a security system be constructed from the apparatus 100 of the present embodiment. In this case, a security system manager may use a conventional fingerprint recognition apparatus to confirm whether a specific person who wants to record his/her fingerprint is a person previously registered in the apparatus. After an affirmative confirmation, the system manager can operate the apparatus 100 of the present embodiment to record that person's fingerprint as a reference fingerprint. Security management can be improved.

As described above, the individual identification apparatus of the present embodiment is provided for comparing a target pattern of an arbitrary person with a recorded reference pattern of a specific person, thereby judging whether the arbitrary person is the specific person. The apparatus has a calculation processing portion 60. In order to previously record a pattern of the specific person as a reference pattern, the portion 60 calculates correlations between the pattern of the specific person and comparative patterns which belong to other people. The portion 60 records the pattern of the specific person as a reference pattern only when the correlations between the pattern of the specific person and the comparative patterns are equal to or lower than a threshold. The portion 60 refuses to record, as a reference pattern, such a pattern that provides high correlations with regards to the other people's patterns (comparative patterns) and therefore that has a high similarity with regards to the other people's patterns. There is a small possibility that the apparatus will erroneously judge a match between an arbitrary person and the specific person when the arbitrary person is different from the specific person.

It Is noted that the individual identification apparatus 100 performs the reference fingerprint storage process of FIG. 2 every time a specific person accesses the apparatus 100 to record his/her fingerprint. Accordingly, when a plurality of specific people access the apparatus 100, the apparatus performs the reference fingerprint storage process a plurality of times and records a plurality of reference fingerprints for the plurality of specific people (enrollees). When an arbitrary person accesses the apparatus 100 to be identified as one of the plurality of enrolled people (enrollees), the arbitrary person designates the identification number of the enrollee in S211 during the individual identification process of FIG. 5(A). The apparatus 100 then performs the individual identification process to determine whether or not the arbitrary person is the designated enrollee.

In the above description, the comparative fingerprints are obtained from the randomly-selected six hundred people. However, the comparative fingerprints may be selected from a plurality of individuals' fingerprints that present high cross-correlations. That is, each comparative fingerprint presents high cross-correlations with regards to other individuals' fingerprints at a high frequency. For example, each comparative fingerprint presents cross-correlations of values equal to or higher than a predetermined standard value at a frequency equal to or higher than a predetermined frequency.

In this case, each comparative fingerprint has many points common with other people's fingerprints. In other words, each comparative fingerprint is a highly typical fingerprint which has high generosity. The individual identification apparatus 100 can refuse to record reference fingerprints that are similar to those typical fingerprints. There is a small possibility that a recorded reference fingerprint be similar to a target fingerprint when the arbitrary person under investigation is not the specific person. There is a small possibility that the apparatus will erroneously judge a match between the arbitrary person and the specific person when the arbitrary person is different from the specific person. The apparatus 100 can therefore perform individual identification operation with a lower false acceptance error rate.

The apparatus 100 may store at least one comparative fingerprint which is a typical fingerprint and therefore which has many points common with a number of other fingerprints. The individual identification apparatus 100 can therefore refuse to record reference patterns that are similar to such a typical fingerprint. There is a small possibility that any recorded reference fingerprint be similar to a target fingerprint when the arbitrary person under investigation Is not the specific person. There is a small possibility that the apparatus will erroneously judge a match between the arbitrary person and the specific person when the arbitrary person is different from the specific person.

A second embodiment of the individual identification apparatus of the present invention will be described below.

The individual identification apparatus of the second embodiment is the same as that of the first embodiment except that the already-stored reference fingerprints are used as the comparative fingerprints. That is, according to the present embodiment, the comparative fingerprints include the already-recorded reference fingerprints for the specific people. In other words, a plurality of reference fingerprints, which are stored in the RAM 9 and the HD 10 for a plurality of enrollees, are used as comparative fingerprints during the reference fingerprint storage process for another specific person who newly accesses the apparats 100 to record his/her fingerprint.

With this structure, the apparatus 100 of the present embodiment refuses to record the fingerprint of the specific person when the fingerprint has high similarity in regards to the already-recorded reference fingerprints. In other words, the apparatus 100 refuses to record a fingerprint of the specific person when the fingerprint is highly similar to the already-enrolled people's fingerprints.

The apparatus 100 of the present embodiment is especially advantageous when the apparatus 100 is applied to a bank security system for bill settlements. The apparatus can refuse to record a fingerprint of an imposter whose fingerprint is similar to a fingerprint, of the bill settlement manager, which is already stored as a reference fingerprint. It therefore becomes possible to prevent the imposter to access the bank security system.

It is noted that when the apparatus stores a large number of reference fingerprints for a large number of people (enrollees), a specific person, who desires to newly record his/her fingerprint in the apparatus, may have to remove his/her finger and try to input a different fingerprint many times in S208 during the storage process of FIG. 2.

Considering this annoyance, the apparatus of the present embodiment may be designed to originally pick up and store a plurality of fingerprints from each specific person (enrollee). For example, the apparatus may be designed to pick up ten fingerprints from both hands of each person. The most appropriate one is selected from the plurality of fingerprints, and is used both as a reference fingerprint and as a comparative fingerprint. The most appropriate one has a low cross-correlation with regards to other people's fingerprints, a good contrast, and a high reproducibility.

In more concrete terms, a fingerprint is picked up in S202 of FIG. 2 "n" times from each of ten fingers of the specific person, where n is an integer higher than one. Then, a most appropriate one is selected from the thus obtained n×10 fingerprints according to the following evaluation standards:

(1) A maximum value is calculated for cross-correlations between each of the n×10 fingerprints and all the already-stored reference fingerprints. A fingerprint, which presents a high cross-correlation maximum value, is improper for being recorded as the reference fingerprint.

(2) A fingerprint which has high contrast and a large area is appropriate for the reference fingerprint.

(3) Autocorrelations are calculated between the "n" number of fingerprints for each finger. A fingerprint, which presents a high autocorrelation, has a high reproducibility and therefore is appropriate for the reference fingerprint.

The CPU 8 selects one fingerprint according to the above-described standards, and stores the selected fingerprint in the RAM 9 and the HD 10 as a reference fingerprint for the specific person. The CPU 8 also stores in the RAM 9 and the HD 10 the remaining, non-selected fingerprints of the specific person.

The thus-stored reference fingerprint and the remaining, non-selected fingerprints of one specific person (referred to as a "first specific person") will be used during a reference fingerprint storage process for another specific person (referred to as a "second specific person") as described below.

It is now assumed that the apparatus refuses to record one reference fingerprint candidate of the second specific person during the storage process of FIG. 2 because a correlation between the reference fingerprint candidate and the already-stored reference fingerprint of the first specific person has a high value. The CPU 8 may not use thereafter this reference fingerprint of the first specific person as a reference fingerprint during an individual identification process for identifying an arbitrary person as the first specific person. Instead, the CPU 8 will use, as a reference fingerprint, one of the other non-selected fingerprints of the first specific person.

When performing an individual identification operation with the thus replaced fingerprint, the CPU 8 may control the display 6, in response to the inputted identification number of the first specific person, to show that the arbitrary person should place his/her finger which corresponds to the replaced fingerprint.

Even though the replaced fingerprint is insufficient in its contrast or area, the fingerprint has a low similarity in regards to other people's fingerprints including the second specific person. Accordingly, the apparatus can perform its individual identification operation with using a fingerprint which has a lower similarity in regards to other people's fingerprints. The apparatus can present a high recognition ability and provide a more reliable security system.

A third embodiment will be described below with reference to FIGS. 7 through 10.

The individual identification apparatus of the present embodiment is the same as that of the first embodiment except for the following points. In the same manner as in the first embodiment, the apparatus 100 compares the reference fingerprint candidate with the comparative fingerprints. When the calculation processing portion 60 judges that the reference fingerprint candidate is similar to the comparative fingerprints, the portion 60 performs a masking operation on the reference fingerprint candidate. The masking operation reduces the similarity of the candidate with regards to the comparative fingerprints. The portion 60 then stores the reference fingerprint candidate in each of the RAM 9 and the HD 10.

The reference fingerprint storage process will be described below in greater detail. As shown in FIG. 8(A), in the same manner as in the first embodiment, the CPU 8 performs the processes S201–S205 and calculates in S206 a maximum correlation value between the reference fingerprint candidate and the comparative fingerprints. The CPU 8 then compares in S207 the obtained maximum correlation value with the threshold $\alpha$. When the correlation value exceeds the threshold $\alpha$, the CPU 8 performs in S210 a predetermined masking operation to a region of the reference fingerprint candidate where the candidate presents a high similarity with regards to the comparative fingerprints. The masking operation is for erasing or shading the high similarity-presenting region of the fingerprint candidate. The CPU 8 then stores in S209 the fingerprint candidate as a reference fingerprint.

The masking operation may be achieved to a reference fingerprint candidate every time the candidate presents the correlation higher than the threshold $\alpha$. Or otherwise, when one reference fingerprint candidate of one person presents the correlation higher than the threshold $\alpha$, trial of the recordation operation is again performed for other fingers of that person in the same manner as in S208 of FIG. 2. The masking operation is performed to the first picked-up fingerprint candidate only when all the other fingers are refused from being recorded or are inappropriate because of their small areas or because of their thin patterns.

Figure 7:
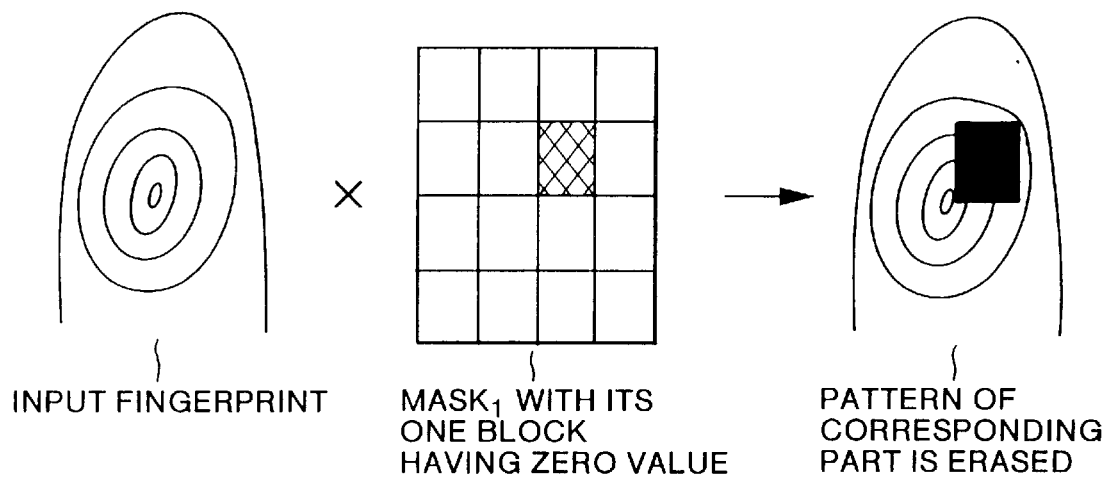
FIG. 7 illustrates one example of a masking operation subjected to a fingerprint.
Figure 8:
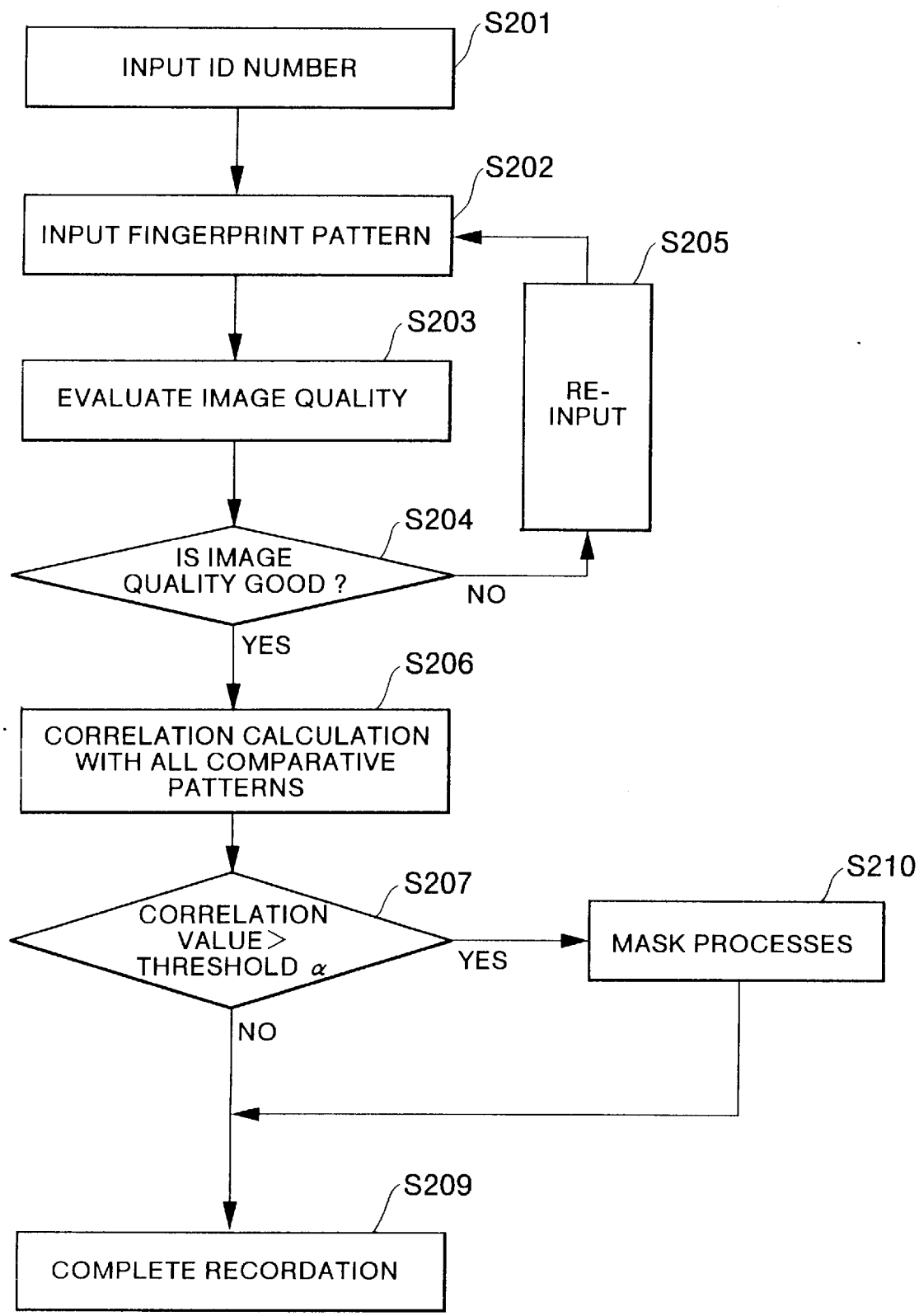
FIG. 8(A) is a flowchart of a fingerprint recordation process in which a reference fingerprint candidate is subjected to a masking operation and then stored as a reference fingerprint.
FIG. 8(B) is a flowchart of a fingerprint recordation process in which a reference fingerprint candidate is Fourier transformed, subjected to a masking operation, and then stored as a reference filter.
FIG. 8(C) illustrates a correlation calculation employed in the individual identification process of FIG. 5(A) when the reference fingerprint is Fourier transformed before being stored as shown in FIG. 8(B)
Figure 8:
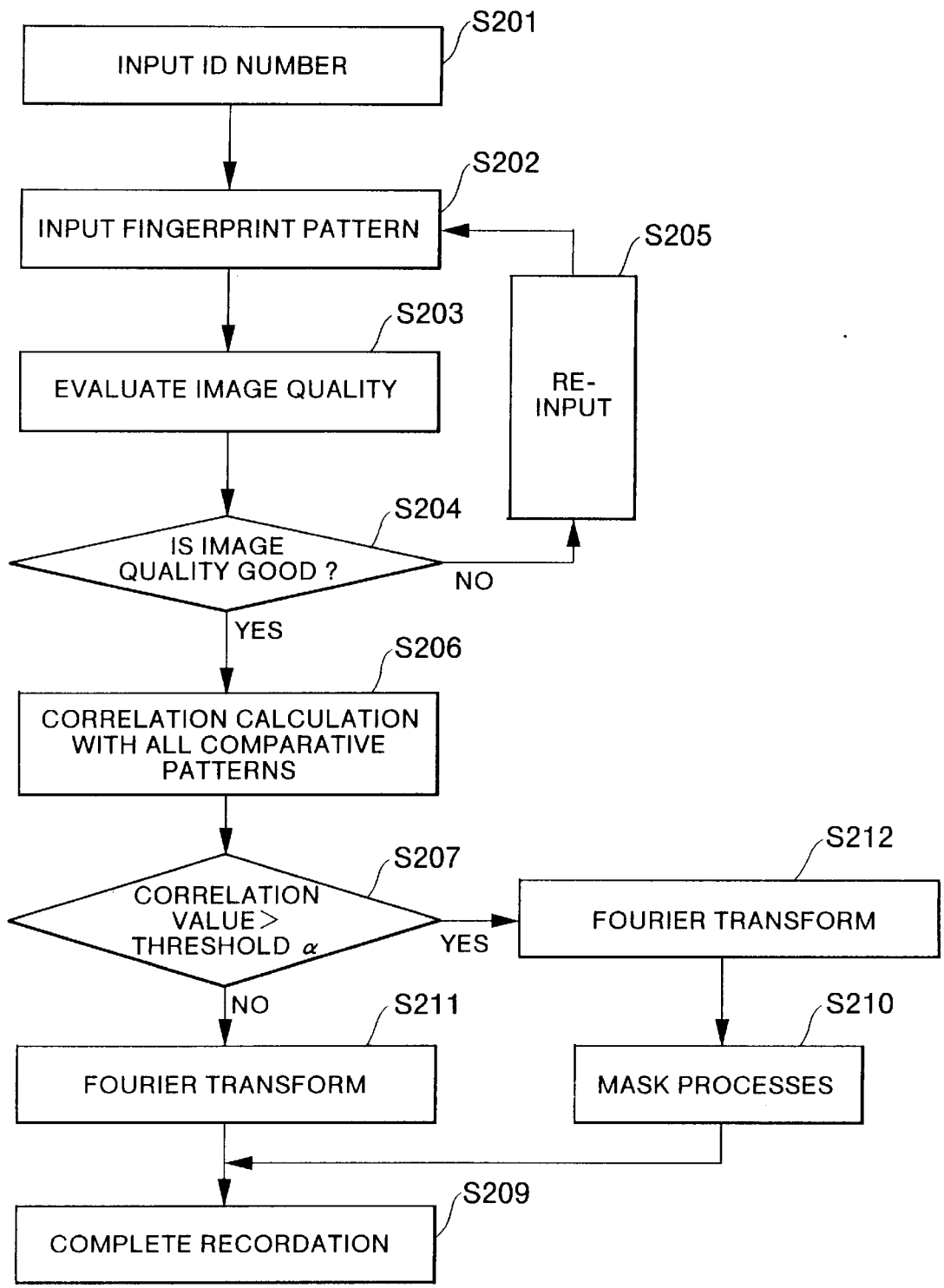
Figure 8:
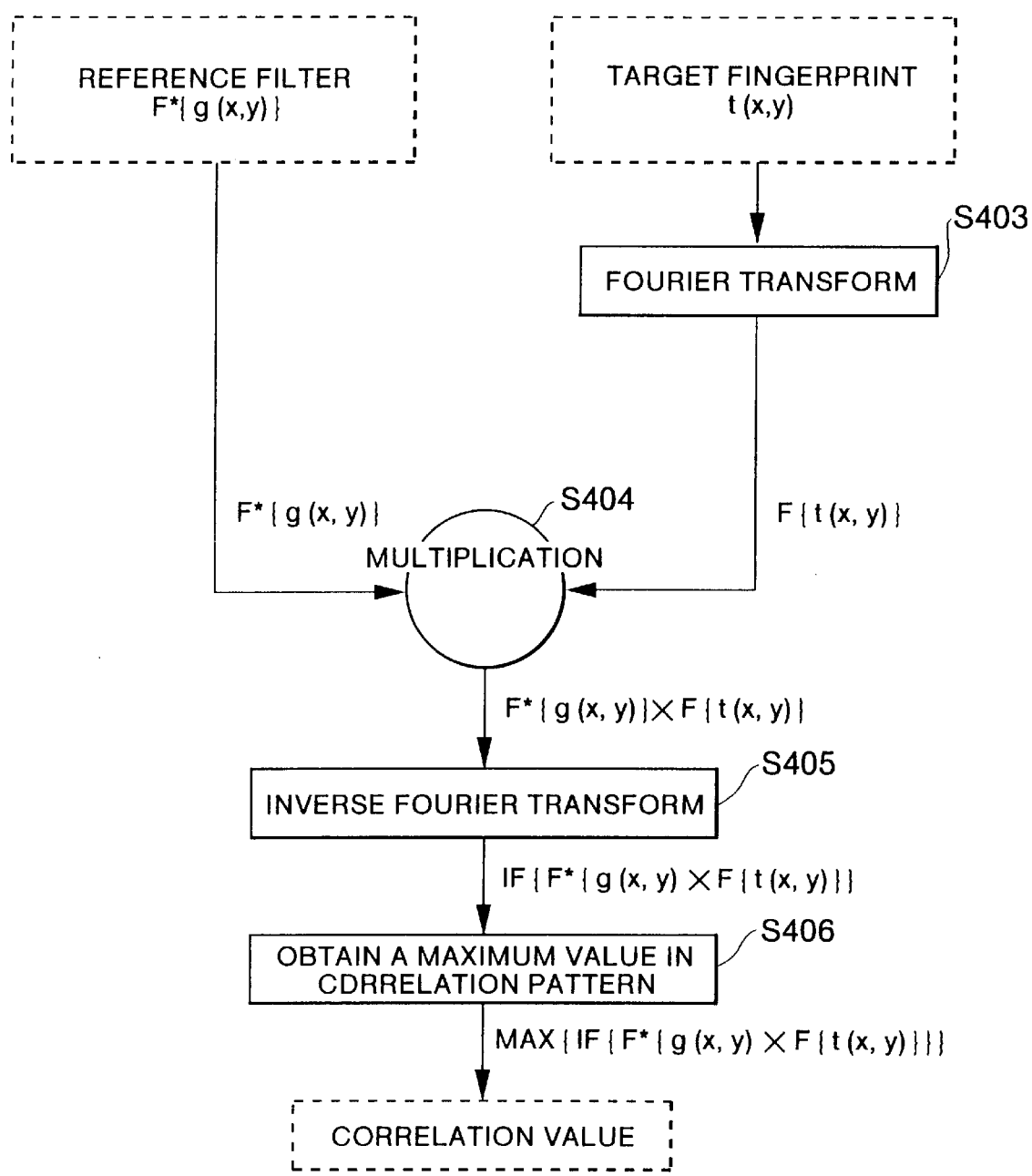

One example of the masking operation of S210 will be described below. As shown in FIG. 7, the reference fingerprint candidate is divided into 16 (=4×4) blocks. Out of the 16 blocks, one is selected in correspondence with an area of the fingerprint candidate which presents high similarity with regards to the comparative fingerprints. According to the masking operation, a pattern is erased from the selected blocked area of the fingerprint so that a correlation between the fingerprint and the comparative fingerprints will become equal to or lower than the threshold $\alpha$. Then, the fingerprint is recorded as a reference fingerprint.

As shown in FIG. 7, a mask pattern $MASK_1$ (x, y) used in this masking operation has 16 blocks. The mask pattern $MASK_1$ (x, y) can be represented by the following equation (5):

$$MASK_1\ (x, y)=0 \text{ in a block to be erased; and } =1 \text{ in blocks to be maintained.} \qquad (5)$$

In other words, the mask $MASK_1$ (x, y) has intensity of zero (0) at a block corresponding to a portion, of the reference candidate, which presents high similarity in regards to the comparative fingerprints. The reference fingerprint candidate g (x, y) is multiplied with the mask $MASK_1$ (x, y) so that the high-similarity presenting portion is erased from the reference fingerprint candidate.

It is now assumed that the mask is designed to have its intensity change rapidly at a border between the pattern erasing block and the pattern maintaining block and that a reference fingerprint candidate is subjected to the masking operation with this mask before being recorded as a reference fingerprint. When the thus recorded reference fingerprint is Fourier transformed in S401 during the individual identification process, the mask pattern, multiplied in the reference fingerprint, will also be subjected to the Fourier transformation and will contribute to formation of an output characteristic signal. Accordingly, there is a possibility that the mask pattern, which is multiplied or overlapped in the reference fingerprint, will be Fourier transformed into a high correlation signal. Even when the reference fingerprint and a target fingerprint belong to two different people, the apparatus will erroneously output a high correlation output and will recognize them as identical people. Even though such a problem is unlikely to occur, it is preferable to prevent such a problem from occurring. In order to prevent such a problem from occurring, it is necessary to decrease the intensity of the Fourier image of the mask pattern as small as possible and to decrease influence of the mask pattern on the individual identification operation.

In view of this, it is preferable that the intensity of the mask pattern not rapidly change at the border between the pattern erasing block and the pattern maintaining block. It is therefore desirable to perform a smoothing operation on the border. For example, following the above-described masking operation, the fingerprint candidate may be further subjected to another masking operation. During this second masking operation, a vicinity calculation mask is used to smooth the border between the pattern erasing block and the pattern maintaining block.

One example of this masking operation will be described below.

During the masking operation, intensity of each dot MASK (x, y) in the reference fingerprint candidate (which is already subjected to the block-erasing masking operation) is smoothed into intensity $MASK_2$ (x, y) in the following manner:

$$MASK_2\ (x, y)=\{4\times MASK\ (x, y)+MASK\ (x-1, y)+MASK_2\ (x, y-1)+MASK\ (x+1, y)+MASK\ (x, y+1)\}/8 \qquad (6)$$

In other words, the dot intensity $MASK_2$ (x, y) is obtained as an average of weighted intensities of dots which surround the dot having the intensity MASK (x, y).

The block-erased fingerprint candidate is subjected to this second masking operation a plurality of times. As a result, intensity of the fingerprint candidate gradually changes from the pattern erasing block to the pattern maintaining block. It is therefore possible to reduce influence of the mask pattern on the individual identification operation.

Alternatively, instead of the erasing mask $MASK_1$, only the vicinity smoothing calculation mask can be used for masking the entire area of the fingerprint to shade the ridges of the fingerprint. In other words, intensity g(x, y) of each dot of the reference fingerprint candidate is subjected to the masking operation and converted into a dot intensity $MASK'_2$ (x, y) in the following manner:

$$MASK_2\ (x, y)=\{4\times g(x, y)+g(x-1, y)+g(x, y-1)+g(x+1, y)+g(x, y+1)\}/8$$

It is possible to obtain the same advantages as those obtained through using the pattern erasing mask $MASK_1$. The fingerprint may be subjected to the masking operation a plurality of times, the number of times being dependent on the number of dots "n" existing between two adjacent fingerprint ridges. As a result, the intensity of the ridges will be smoothed. Generally, the fingerprint may be subjected to the masking operation the number "n" of times.

In the above description, the fingerprint image itself is subjected to the masking operation. However, the fingerprint may be subjected to the masking operation on its Fourier transform plane, i.e., spatial frequency plane. In other words, a Fourier transformed image of the fingerprint can be subjected to the masking operation.

In more concrete terms, as shown in FIG. 8(B), when the maximum correlation value exceeds the threshold $\alpha$ ("Yes" in S207) during the storage process, the CPU 8 Fourier transforms the reference fingerprint candidate g (x, y) into F{g (x, y)} in S212. In S212, the CPU 8 further obtains a phase term $F^*${g (x, y)} of a conjugate of the Fourier transformed image. Then, the CPU 8 performs in S210 the masking operation to the conjugate phase term $F^*\{g(x, y)\}$. The CPU 8 stores the masking-subjected pattern in the RAM 9 and the HD 10 as a reference filter in S209.

In this case, during the individual identification process, the correlation calculation step S213 shown in FIG. 5(A) is performed as shown in FIG. 8(C). The masking-subjected reference filter $F^* \{g(x, y)\}$ is retrieved from the RAM 9 or the HD 10. The masking-subjected reference filter is then multiplied in S404 with a Fourier transformed target fingerprint. This process of FIG. 8(C) is the same as that of FIG. 5(B) except that S401 and S402 are omitted.

Figure 9:
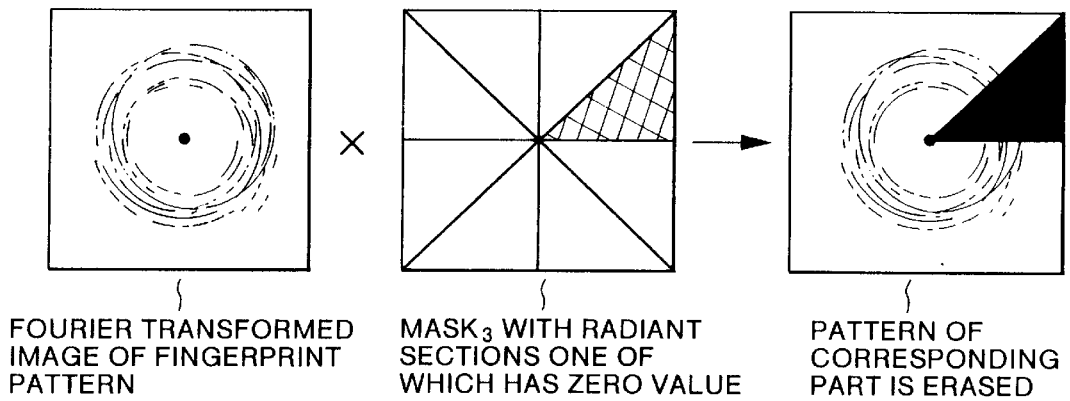
FIG. 9 illustrates one example of a masking operation subjected to a fingerprint on its Fourier transform plane.
Figure 10:
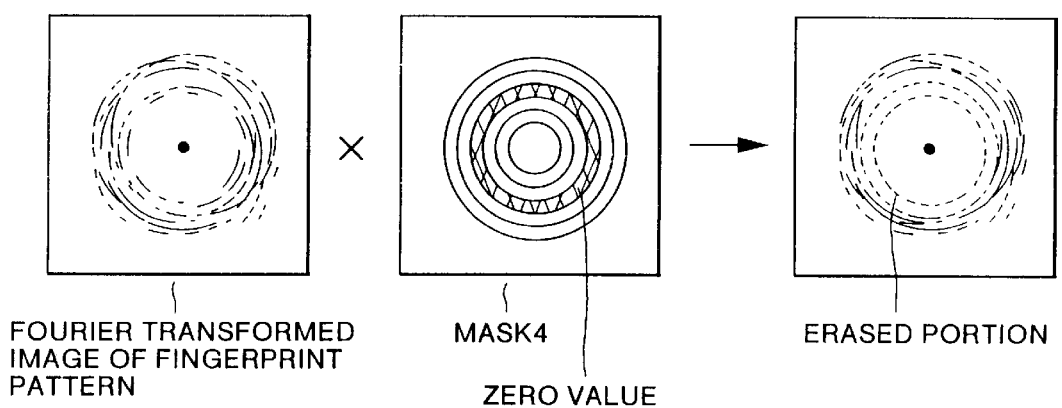
FIG. 10 illustrates another example of the masking operation subjected to a fingerprint on its Fourier transform plane.

FIGS. 9 and 10 show examples of the masking operation performed on the Fourier transform plane. FIG. 9 shows a mask $MASK_3$ having a plurality of blocks which are divided by a plurality of lines radially extending from the center of the mask. FIG. 10 shows a mask $MASK_4$ having a plurality of concentric rings which serve as blocks. In order to erase, from one of the blocks, a pattern of the fingerprint that will largely influence on production of a high cross-correlation, the corresponding block in the mask $MASK_3$ or $MASK_4$ is set with a zero intensity value.

The conjugate phase term of the Fourier transformed fingerprint candidate may be subjected to a masking operation with the mask $MASK_3$ or $MASK_4$ before being recorded as a reference filter. The thus obtained reference filter, filter (x, y), is represented by the following equation (7):

$$\text{filter } (x, y) = \text{MASK } (x, y) \times F^* \{g(x, y)\} \quad (7)$$

where MASK (x, y) $MASK_3$ or $MASK_4$

The mask may not be limited to the above-described erasing binary mask $MASK_3$ or $MASK_4$, but may be constructed from a shading mask, or the like.

In the above description, the conjugate phase term $F^*\{g(x, y)\}$ of the Fourier transformed reference fingerprint candidate is subjected to the masking operation. However, the Fourier transformed image $F\{g(x, y)\}$ of the reference fingerprint candidate can be subjected to the masking operation.

The apparatus of the present embodiment can attain a high recognition ability similar to that of the first and second embodiments. Additionally, a specific person will not need to re-input his/her another fingerprint when his/her already-inputted fingerprint presents a high similarity with regards to other people's fingerprints. It is possible to easily record the reference fingerprint within a short period of time.

The apparatus of the present embodiment is especially advantageous in recognizing individual characteristic patterns other than fingerprints, such as retinal vascular patterns and palm patterns, that have a small number of alternatives. For example, each person has only two pattern choices for the retinal vascular patterns and palm patterns. In comparison with fingerprints, there is a higher possibility that both of the two patterns will present high correlation with regards to other people's patterns, and therefore that both of the two patterns may be refused from being recorded. The apparatus of the present embodiment allows recordation of the patterns even in this case. Still, the apparatus can recognize individuals with a high recognition ability.

As described above, the Individual identification apparatus of the present invention does not record a characteristic pattern which is highly similar to other individuals' fingerprints. The individual identification apparatus can therefore recognize individuals with a high recognition rate. The apparatus has a low false acceptance error rate.

While the invention has been described in detail with reference to specific embodiments thereof, it would be apparent to those skilled in the art that various changes and modifications may be made therein without departing from the spirit of the inventions For example, according to the above-described embodiments, the comparison calculation achieved in S206 and in S213 employ the correlation calculation. However, the comparison calculation may employ other various image processing methods.

Additionally, in the above-described embodiments, the correlation calculations are performed through a digital calculation processes. However, the correlation calculation may be performed within a short period through an optical calculating operation.

As described above, the individual identification apparatus of the present invention has the calculation processing portion for judging whether or not to record a predetermined characteristic pattern (reference pattern candidate) of a specific individual as a reference pattern of the specific individual. The calculation processing portion calculates a correlation value between the reference pattern candidate and a characteristic pattern (comparative pattern) of at least one individual other than the specific individual. The calculation processing portion records the reference pattern candidate as the reference pattern only when the correlation value is equal to or lower than a predetermined threshold value. The individual identification apparatus judges whether or not an arbitrary person is the specific person through comparing a corresponding characteristic pattern of the arbitrary individual (target pattern) with the thus stored reference pattern of the specific individual.

The individual identification apparatus of the present invention thus refuses to record the reference pattern candidate as a reference pattern when the reference pattern candidate has a high correlation with regards to the other individual's characteristic pattern. In other words, the apparatus of the present invention refuses to record the reference pattern candidate as the reference pattern when the reference pattern candidate is highly similar to the other individual's pattern. The apparatus compares the target pattern with the thus recorded reference pattern in order to judge whether or not the arbitrary person is the specific person. Because the recorded reference pattern generally presents a low similarity to another individual's pattern, when the arbitrary person is not the specific person, there is a small possibility that the target pattern be similar to the reference pattern. There is a small possibility that the apparatus will erroneously misjudge the arbitrary person as the specific person when the arbitrary person is different from the specific person. The apparatus of the present invention can therefore perform individual identification operation with a low false acceptance error rate.

According to the first embodiment, the calculation processing portion calculates a plurality of correlation values between the reference pattern candidate and a plurality of comparative patterns. The calculation processing portion records the reference pattern candidate as a reference pattern only when a maximum value of the plurality of correlation values In equal to or lower than the threshold value. In other words, the calculation processing portion records the reference pattern candidate as a reference pattern only when all the plurality of correlation values are equal to or lower than the threshold value.

The apparatus thus records only the reference pattern that presents low correlations with all the comparative patterns. The apparatus compares the target pattern with the recorded reference pattern in order to judge whether or not the arbitrary person is the specific person. The recorded reference pattern generally presents a low similarity to other individuals patterns. Accordingly, when the arbitrary person is not the specific person, there is a small possibility that the target pattern be similar to the reference pattern. There is a small possibility that the apparatus will erroneously misjudge the arbitrary person as the specific person when the arbitrary person is different from the specific person. The apparatus of the present invention can therefore perform individual identification operation with a low false acceptance error rate.

The comparative patterns may preferably be selected from a plurality of individuals' characteristic patterns as those that present high cross-correlations. Each comparative pattern presents cross-correlations, with regards to other individuals' patterns, of values equal to or higher than the predetermined standard value at a frequency equal to or higher than the predetermined frequency.

In this case, each comparative pattern has many points common with other individuals' patterns. In other words, the comparative patterns have high generosity. The individual identification apparatus can therefore refuse to record such reference patterns that are similar to those typical patterns. When an arbitrary person under investigation is not the specific person, there is a small possibility that the reference pattern be similar to the target pattern. There is a small possibility that the apparatus will erroneously misjudge the arbitrary person as the specific person when the arbitrary person is different from the specific person. The apparatus can therefore perform individual identification operation with a low false acceptance error rate.

According to the second embodiment, the comparative characteristic patterns, used for recording a reference pattern of one specific person, include reference patterns already recorded for persons (enrollees) other than the specific person. The apparatus therefore records a reference pattern for the specific person only when the reference pattern is not similar to the already-recorded reference patterns of the other enrollees. Because the thus recorded reference pattern presents a low similarity to the other enrollees' patterns, even when the arbitrary person, different from the specific person, is one of the enrollees, there is still a small possibility that the target pattern of the arbitrary person be similar to the reference pattern. There is a small possibility that the apparatus will erroneously misjudge the arbitrary person as the specific person. The apparatus of the present invention can therefore perform individual identification operation with a low false acceptance error rate.

When judging whether or not to record a reference pattern candidate as a reference pattern for one specific person, the calculation processing portion calculates a correlation between the reference pattern candidate and at least one reference pattern stored already for at least one enrollee. The calculation portion refuses to record the reference pattern candidate when the correlation value is higher than the threshold. In this case, the apparatus may not use the already-recorded reference pattern during a subsequent individual identification operation for identifying an arbitrary person with that enrollee. The apparatus replaces the reference pattern of the enrollee with an auxiliary pattern which belongs to the same enrollee.

Accordingly, the auxiliary pattern will be used as a reference pattern during the subsequent individual identification process for that enrollee. Even when the specific person, who has the fingerprint similar to the reference pattern of the enrollee, desires to be identified as the enrollee, the device will not misjudge the specific person as the enrollee because the device does not use the enrollee's first recorded reference pattern.

According to the third embodiment, the calculation processing portion performs a masking operation on the reference pattern candidate, when the maximum correlation value between the candidate and the comparative patterns exceeds the threshold. The masking operation decreases the correlation value to be equal to or lower than the threshold.

In this case, the apparatus records therein a reference pattern of the specific person whose similarity with regards to the comparative pattern is reduced through the masking operation. The apparatus can certainly record the reference pattern while reducing the false acceptance error rate. The apparatus can record the reference pattern without any complicated procedures.

What is claimed is:

1. An individual identification apparatus for judging whether or not an arbitrary individual is a specific individual, the apparatus comprising:

reference pattern storage judging means for calculating a correlation between a reference pattern candidate representative of a specific individual, which is desired to be newly recorded as a reference pattern, and at least one comparative pattern representative of another person, thereby judging whether or not to record the reference pattern candidate as the reference pattern based on the calculated correlation;

reference pattern storage means for recording the reference pattern candidate as the reference pattern when the reference pattern storage judging means determines to record the reference pattern candidate and for refusing to record the reference pattern candidate when the reference pattern storage judging means determines not to record the reference pattern candidate;

comparing means for comparing a target pattern representative of an arbitrary individual with the reference pattern of the specific individual, thereby judging whether or not the arbitrary individual is the specific individual;

wherein said reference pattern storage means comprises:
  recording means for recording the reference pattern candidate as the reference pattern when the reference pattern storage judging means determines to record the reference pattern candidate; and
  recording refusing means for refusing to record the reference pattern candidate when the reference pattern storage judging means determines not to record the reference pattern candidate, the recording refusing means including control means for performing storage control operation onto the reference pattern candidate;
  reference image pick up means for picking up the reference pattern candidate representing the specific individual; and
  arbitrary image pick up means for picking up the target pattern representing the arbitrary individual; and
  wherein the control means includes retrial control means for controlling the reference image pick up means to pick up another reference pattern candidate representing the specific individual and for controlling the reference pattern storage judging means to calculate a correlation between the presently-picked up reference pattern candidate and at least one comparative pattern, thereby judging whether or not to record the presently-picked up reference pattern candidate as the reference pattern based on the calculated correlation.

2. An individual identification apparatus as claimed in claim 1, wherein the reference pattern storage judging means determines to record the reference pattern candidate as the reference pattern when the calculated correlation value is equal to or lower than a predetermined threshold value.

3. An individual identification apparatus as claimed in claim 2, wherein the reference pattern storage judging means performs a masking operation on the reference pattern candidate when the correlation between the candidate and the comparative pattern exceeds the threshold, so that the correlation is changed to be equal to or lower than the threshold.

4. An individual identification apparatus as claimed in claim 1, wherein the reference pattern storage judging means calculates a plurality of correlation values between the reference pattern candidate and a plurality of comparative patterns, and determines to record the reference pattern candidate based on the calculated correlation values.

5. An individual identification apparatus as claimed in claim 4, wherein the reference pattern storage judging means determines to record the reference pattern candidate only when a maximum value of the correlation values is equal to or lower than the threshold value.

6. An individual identification apparatus as claimed in claim 4, wherein the comparative patterns are selected from patterns representing a plurality of people that present cross-correlations of values equal to or higher than a predetermined standard value at a frequency equal to or higher than a predetermined frequency.

7. An individual identification apparatus as claimed in claim 1, wherein the comparative pattern presents cross-correlations, with regards to patterns representing other people, of values equal to or higher than a predetermined standard value, at a frequency equal to or higher than a predetermined frequency.

8. An individual identification apparatus as claimed in claim 1, wherein the comparative pattern includes a reference pattern already recorded for a first person other than the specific individual.

9. An individual identification apparatus as claimed in claim 8, wherein the reference pattern storage means replaces the reference pattern for the first person with an auxiliary pattern belonging to the same first person when the reference pattern storing judging means judges not to record the reference pattern candidate of the specific individual based on a calculated correlation between the reference pattern candidate of the specific individual and the reference pattern of the first person.

10. An individual identification apparatus as claimed in claim 1,
wherein the reference image pick up means picks up an image of a predetermined body portion of the specific individual and produces the reference pattern candidate,
wherein the reference pattern storage judging means calculates a correlation between the specific individual's reference pattern candidate and at least one comparative pattern of the predetermined body portion of the other person, thereby judging whether or not to record the reference pattern candidate as the reference pattern based on the calculated correlation, and
wherein the arbitrary image pick up means picks up an image of the predetermined body portion of the arbitrary individual and produces the target pattern.

11. An individual identification as claimed in claim 10, wherein the predetermined portion is a finger, and the reference pattern candidate indicates a fingerprint of the specific individual.

12. An individual identification apparatus as claimed in claim 1, wherein the reference pattern storage judging means includes:

Fourier transforming means for performing a Fourier transform on the reference pattern candidate and at least one comparative pattern;
multiplying means for multiplying the Fourier transforms with each other;
inverse Fourier transforming means for performing an inverse Fourier transform on the multiplied result to thereby obtain a correlation output; and
judging means for judging, based on the correlation output, whether or not to record the reference pattern candidate as the reference pattern.

13. An individual identification apparatus for determining whether or not an arbitrary individual is a specific individual, the apparatus comprising:
reference candidate reception means for receiving a predetermined pattern representative of a specific individual as a reference pattern candidate;
comparative pattern storage means for storing at least one corresponding comparative pattern representative of at least one individual other than the specific individual as a comparative pattern;
first correlation calculating means for calculating a correlation between the reference pattern candidate and the comparative pattern through performing a Fourier transform on the reference pattern candidate and the comparative pattern, multiplying the Fourier transforms with each other, and performing an inverse Fourier transform on the multiplied result to obtain a correlation, thereby determining, based on the correlation, whether or not to record the reference pattern candidate as a reference pattern;
reference storage means for storing the reference pattern candidate as a reference pattern when the first correlation calculating means determines to record the reference pattern candidate and for refusing to store the reference pattern candidate as the reference pattern and performing a reference storage control operation when the first correlation calculating means determines not to record the reference pattern candidate;
target reception means for receiving, as a target pattern, a corresponding pattern representative of an arbitrary individual desired to be identified as the specific individual; and
second correlation calculating means for calculating a correlation between the target pattern and the reference pattern through performing a Fourier transform on the target pattern and the reference pattern, multiplying the Fourier transforms with each other, and performing an inverse Fourier transform on the multiplied result to obtain a correlation, thereby judging, based on the calculated correlation, whether or not the arbitrary person is the specific individual.

14. An individual identification apparatus as claimed in claim 13, wherein the reference candidate reception means receives an image of a predetermined body portion of the specific individual as the reference pattern candidate, the comparative pattern storage means storing at least one corresponding image of the predetermined body portion of at least one individual other than the specific individual as the comparative pattern, the target reception means receiving, as the target pattern, a corresponding image of the predetermined body portion of the arbitrary individual.

15. An individual identification apparatus as claimed in claim 14, wherein the predetermined body portion is a finger.

16. An individual identification apparatus as claimed in claim 15, wherein the reference storage means includes retrial control means for, when the reference first correlation calculating means determines not to record the reference pattern candidate indicative of a certain finger of the specific individual, controlling the reference candidate reception means to receive a pattern of another finger of the specific individual as another reference pattern candidate, and for controlling the first correlation calculating means to calculate a correlation between the other reference pattern candidate and at least one comparative pattern, to thereby judge whether or not to record the other reference pattern candidate as the reference pattern based on the calculated correlation.

17. An individual identification apparatus as claimed in claim 15, wherein the reference storage means includes modifying means for, when the first correlation calculating means determines not to record the reference pattern candidate, modifying the reference pattern candidate and for storing the modified reference pattern candidate as the reference pattern.

18. An individual identification apparatus as claimed in claim 17, wherein the modifying means includes masking means for performing a masking operation on the reference pattern candidate when the first correlation calculating means determines not to record the reference pattern candidate as a reference pattern, the masking operation decreasing the correlation value, the reference storage means recording the thus masking-subjected reference pattern candidate.

19. An individual identification apparatus as claimed in claim 15, wherein the first correlation calculating means determines to record the reference pattern candidate as a reference pattern only when the correlation is equal to or lower than a predetermined threshold.

20. An individual identification apparatus as claimed in claim 15,
wherein the comparative pattern storage means stores a plurality of comparative patterns representative of a plurality of individuals other than the specific individual, and
wherein the first correlation calculating means calculates a plurality of correlation values between the reference pattern candidate and the plurality of comparative patterns, thereby determining whether or not to record the reference pattern candidate as the reference pattern.

21. An individual identification apparatus as claimed in claim 20, wherein the first correlation calculating means determines to record the reference pattern candidate as a reference pattern only when a maximum value of the plurality of correlation values is equal to or lower than the threshold value.

22. An individual identification apparatus as claimed in claim 21, further comprising masking means for performing a masking operation on the reference pattern candidate when the first correlation calculating means determines not to record the reference pattern candidate as a reference pattern because the maximum correlation value between the reference pattern candidate and the comparative patterns exceeds the threshold, the masking operation decreasing the maximum correlation value to be equal to or lower than the threshold, the reference storage means recording the thus masking-subjected reference pattern candidate.

23. An individual identification apparatus as claimed in claim 20, wherein the plurality of comparative patterns include a plurality of patterns representative of a plurality of individuals, each of which presents high cross-correlations with other individuals' patterns.

24. An individual identification apparatus as claimed in claim 23, wherein each comparative pattern presents cross-correlations, with regards to other individuals' patterns, of values equal to or higher than a predetermined standard value at a frequency equal to or higher than a predetermined frequency.

25. An individual identification apparatus as claimed in claim 15, wherein at least one comparative pattern includes at least one reference pattern already recorded for at least one person other than the specific person.

26. An individual identification apparatus as claimed in claim 25,
wherein the reference candidate reception means receives a plurality of the predetermined patterns representative of a first specific individual, the reference storage means storing one of the patterns as a first reference pattern and other remaining patterns as auxiliary patterns,
wherein when the reference reception means receives, as a second reference pattern candidate, the predetermined pattern of a second specific individual other than the first specific individual, the first correlation calculating means calculates a correlation between the second reference pattern candidate and the first reference pattern, the reference storage means replacing the first reference pattern with one of the auxiliary patterns when the calculated correlation is higher than the predetermined threshold.

27. An individual identification apparatus for judging whether or not an arbitrary individual is a specific individual, the apparatus comprising:
correlation calculation means capable of calculating a correlation between two patterns through performing a Fourier transform on two patterns, multiplying the Fourier transforms with each other, and performing an inverse Fourier transform on the multiplied result to thereby obtain a correlation;
reference candidate reception means for receiving a predetermined pattern of a specific individual as a reference pattern candidate;
reference storage judging means for controlling the correlation calculating means to calculate a correlation between the reference pattern candidate and a comparative pattern, thereby determining whether or not to record the reference pattern candidate, the comparative pattern including a corresponding pattern of an individual other than the specific individual;
reference storage means for recording the reference pattern candidate as a reference pattern when the reference storage judging means determines to record the reference pattern candidate and for refusing to record the reference pattern candidate as the reference pattern when the reference storage judging means determines not to record the reference pattern candidate;
target reception means for receiving a target pattern of an arbitrary individual desired to be identified as the specific individual; and
identification judging means for controlling the correlation calculating means to calculate a correlation between the target pattern and the reference pattern, thereby judging whether or not the arbitrary person is the specific individual.

28. An individual identification apparatus as claimed in claim 27, wherein the reference storage means includes:
recording means for recording the reference pattern candidate as the reference pattern when the reference pattern storage judging means determines to record the reference pattern candidate;

recording refusing means for refusing to record the reference pattern candidate when the reference storage judging means determines not to record the reference pattern candidate, the recording refusing means including retrial control means for controlling the reference candidate reception means to receive another pattern of the specific individual as another reference pattern candidate and for controlling the reference storage judging means to actuate the correlation calculation means to calculate a correlation between the other reference pattern candidate and the comparative pattern, thereby judging whether or not to record the other reference pattern candidate as the reference pattern based on the calculated correlation.

29. An individual identification apparatus as claimed in claim 7, wherein the reference storage means includes:

recording means for recording the reference pattern candidate as the reference pattern when the reference pattern storage judging means determines to record the reference pattern candidate; and recording refusing means for refusing to record the reference pattern candidate when the reference storage judging means determines not to record the reference pattern candidate, the recording refusing means including modification control means for modifying the reference pattern candidate and for recording the modified reference pattern candidate as the reference pattern.

30. An individual identification apparatus as claimed in claim 7, wherein the reference candidate reception means receives an image of a predetermined body portion of the specific individual as the reference pattern candidate, the target reception means receiving, as the target pattern, a corresponding image of the predetermined body portion of the arbitrary individual;

further comprising comparative pattern storage means for storing a corresponding image of the predetermined body portion of at least one individual other than the specific individual as the comparative pattern.

31. An individual identification apparatus as claimed in claim 30, wherein the predetermined body portion is a finger.

32. A method of judging whether or not an arbitrary individual is a specific individual, the method comprising the steps of:

receiving a predetermined pattern of a specific individual as a reference pattern candidate;

calculating a correlation between the reference pattern candidate and a comparative pattern, thereby determining whether or not to record the reference pattern candidate, the comparative pattern including a corresponding pattern of an individual other than the specific individual;

recording the reference pattern candidate as a reference pattern when it is determined to record the reference pattern candidate;

performing, when it is determined not to record the reference pattern candidate, a storage control process without recording the reference pattern candidate as the reference pattern;

receiving a target pattern of an arbitrary individual desired to be identified as the specific individual; and calculating a correlation between the target pattern and the reference pattern, thereby judging whether or not the arbitrary person is the specific individual;

wherein the storage control performing step comprises:

failing to record the reference pattern candidate as the reference pattern;

receiving another pattern of the specific individual as another reference pattern candidate; and calculating a correlation between the other reference pattern candidate and the comparative pattern, thereby judging whether or not to record the other reference pattern candidate as the reference pattern based on the calculated correlation.

33. A method as claimed in claim 32, wherein the comparative pattern includes a reference pattern already recorded for a first person other than the specific individual.

34. A method as claimed in claim 33, wherein the storage control process performing step includes the step of replacing the recorded reference pattern, belonging to the first person, with an auxiliary pattern belonging to the same first person when the correlation calculating step determines not to record the reference pattern candidate of the specific person based on a calculated correlation, between the reference pattern candidate of the specific person and the recorded reference pattern of the first person.

35. A method as claimed in claim 32, wherein the correlation calculation step includes the steps of:

performing a Fourier transform on the reference pattern candidate and the comparative pattern;

multiplying the Fourier transforms with each other;

performing an inverse Fourier transform on the multiplied result to thereby obtain a correlation output; and judging means for judging, based on the correlation output, whether or not to record the reference pattern candidate as the reference pattern.

36. A method as claimed in claim 35, wherein the reference pattern candidate is determined as the reference pattern only when the calculated correlation is equal to lower than a predetermined threshold.

37. A method as claimed in claim 35, wherein a plurality of correlations are calculated between the reference pattern candidate and a plurality of comparative patterns, whether or not to record the reference pattern candidate as the reference pattern being determined based on the calculated correlations.

38. A method as claimed in claim 37, wherein the characteristic pattern candidate is determined to be recorded as the reference pattern only when a maximum value of the plurality of correlation values is equal to or lower than the threshold value.

39. A method as claimed in claim 37, wherein the comparative patterns are selected from a plurality of people's patterns that present cross-correlations of values equal to or higher than a predetermined standard value at a frequency equal to or higher than a predetermined frequency.

40. A method as claimed in claim 32, wherein the reference candidate reception step includes the step of picking up an image of a predetermined body portion of the specific individual as the reference pattern candidate, and wherein the target pattern reception step includes the step of picking up, as the target pattern, a corresponding image of the predetermined body portion of the arbitrary individual.

41. A method as claimed in claim 40, wherein the predetermined body portion is a finger.

42. A method of judging whether or not an arbitrary individual is a specific individual, the method comprising:

receiving a predetermined pattern of a specific individual as a reference pattern candidate;

calculating a correlation between the reference pattern candidate and a comparative pattern, thereby determining whether or not to record the reference pattern candidate, the comparative pattern including a corresponding pattern of an individual other than the specific individual;

recording the reference pattern candidate as a reference pattern when it is determined to record the reference pattern candidate;

performing, when it is determined not to record the reference pattern candidate, a storage control process without recording the reference pattern candidate as the reference pattern;

receiving a target pattern of an arbitrary individual desired to be identified as the specific individual; and calculating a correlation between the target pattern and the reference pattern, thereby judging whether or not the arbitrary person is the specific individual;

wherein the storage control performing step comprises:
failing to record the reference pattern candidate as the reference pattern;
modifying the reference pattern candidate; and
recording the modified reference pattern candidate as the reference pattern.

43. A method as claimed in claim 42, wherein the modifying step includes the step of performing a masking operation on the reference pattern candidate when the reference pattern candidate is determined not to be recorded, the masking operation decreasing the correlation value, the thus masking-subjected reference pattern candidate being recorded as the reference pattern.

44. An individual identification apparatus for judging whether or not an arbitrary individual is a specific individual, the apparatus comprising:

reference image pick up means for picking up a reference pattern candidate representative of a specific individual, which is desired to be newly recorded as a reference pattern;

reference pattern storage judging means for calculating a correlation between the reference pattern candidate and at least one comparative pattern representative of another person, thereby judging whether or not to record the reference pattern candidate as the reference pattern based on the calculated correlation;

reference pattern storage means for recording the reference pattern candidate as the reference pattern when the reference pattern storage judging means determines to record the reference pattern candidate and for refusing to record the reference pattern candidate when the reference pattern storage judging means determines not to record the reference pattern candidate;

arbitrary image pick up means for picking up a target pattern representative of an arbitrary individual;

comparing means for comparing the target pattern with the reference pattern of the specific individual, thereby judging whether or not the arbitrary individual is the specific individual;

wherein the reference pattern storage means comprises:
recording means for recording the reference pattern candidate as the reference pattern when the reference pattern storage judging means determines to record the reference pattern candidate; and
recording refusing means for refusing to record the reference pattern candidate when the reference pattern storage judging means determines not to record the reference pattern candidate, the recording refusing means including control means for performing storage control operation onto the reference pattern candidate;

wherein the control means includes modification control means for modifying the reference pattern candidate and for recording the modified reference pattern candidate as the reference pattern.

45. An individual identification apparatus for judging whether or not an arbitrary individual is a specific individual, the apparatus comprising:

an image pick up portion for picking up a reference pattern candidate representing a specific individual, which is desired to be newly recorded as a reference pattern, and picking up a target pattern representing an arbitrary individual; and a control portion, comprising:
reference pattern storage judging means for calculating a correlation between the reference pattern candidate representative of the specific individual and at least one comparative pattern representative of another person, thereby judging whether or not to record the reference pattern candidate as the reference pattern based on the calculated correlation;
reference pattern storage means for recording the reference pattern candidate as the reference pattern when the reference pattern storage judging means determines to record the reference pattern candidate and for refusing to record the reference pattern candidate when the reference pattern storage judging means determines not to record the reference pattern candidate; and
comparing means for comparing the target pattern representative of the arbitrary individual with the reference pattern of the specific individual, thereby judging whether or not the arbitrary individual is the specific individual;
wherein said reference pattern storage means comprises:
recording means for recording the reference pattern candidate as the reference pattern when the reference pattern storage judging means determines to record the reference pattern candidate; and
recording refusing means for refusing to record the reference pattern candidate when the reference pattern storage judging means determines not to record the reference pattern candidate, the recording refusing means including control means for performing storage control operation onto the reference pattern candidate;
wherein the control means includes retrial control means for controlling the image pick up portion to pick up another reference pattern candidate representing the specific individual and for controlling the reference pattern storage judging means to calculate a correlation between the presently-picked up reference pattern candidate and the at least one comparative pattern thereby judging whether or not to record the presently-picked up reference pattern candidate as the reference pattern based on the calculated correlation.

46. An individual identification apparatus for judging whether or not an arbitrary individual is a specific individual, the apparatus comprising:

an image pick up portion for picking up a reference pattern candidate representing a specific individual, which is desired to be newly recorded as a reference pattern, and picking tip a target pattern representing an arbitrary individual; and a control portion, comprising:
reference pattern storage judging means for calculating a correlation between the reference pattern candidate representative of the specific individual and at least one comparative pattern representative of another person, thereby judging whether or not to record the reference pattern candidate as the reference pattern based on the calculated correlation;

reference pattern storage means for recording the reference pattern candidate as the reference pattern when the reference pattern storage judging means determines to record the reference pattern candidate and for refusing to record the reference pattern candidate when the reference pattern storage judging means determines not to record the reference pattern candidate; and comparing means for comparing the target pattern representative of the arbitrary individual with the reference pattern of the specific individual, thereby judging whether or not the arbitrary individual is the specific individual;

wherein said reference pattern storage means comprises:

recording means for recording the reference pattern candidate as the reference pattern when the reference pattern storage judging means determines to record the reference pattern candidate; and recording refusing means for refusing to record the reference pattern candidate when the reference pattern storage judging means determines not to record the reference pattern candidate, the recording refusing means including control means for performing storage control operation onto the reference pattern candidate;

wherein the control means includes modification control means for modifying the reference pattern candidate and for recording the modified reference pattern candidate as the reference pattern.

47. An individual identification apparatus for determining whether or not an arbitrary individual is a specific individual, the apparatus comprising:

a reception portion for receiving, as a reference pattern candidate, a predetermined pattern representative of a specific individual, and receiving, as a target pattern, a corresponding pattern representative of an arbitrary individual desired to be identified as the specific individual;

a comparative pattern storage portion storing at least one corresponding comparative pattern representative of at least one individual other than the specific individual as a comparative pattern; and a control portion comprising:

correlation calculating means for calculating a correlation between two patterns through performing a Fourier transform on the two patterns, multiplying the Fourier transforms with each other, and performing an inverse Fourier transform on the multiplied result to obtain a correlation;

first correlation control means for controlling the correlation calculating means to calculate a correlation between the reference pattern candidate and the comparative pattern through performing a Fourier transform on the reference pattern candidate and the comparative pattern, multiplying the Fourier transforms with each other, and performing an inverse Fourier transform on the multiplied result to obtain a correlation, thereby determining, based on the correlation, whether or not to record the reference pattern candidate as a reference pattern, and performing a reference storage control operation when the first correlation control means determines not to record the reference pattern candidate;

reference storage means for storing the reference pattern candidate as a reference pattern when the first correlation control means determines to record the reference pattern candidate and for refusing to store the reference pattern candidate as the reference pattern and performing a reference storage control operation when the first correlation control means determines not to record the reference pattern candidate; and second correlation control means for controlling the correlation calculating means to calculate a correlation between the target pattern and the reference pattern through performing a Fourier transform on the target pattern and the reference pattern, multiplying the Fourier transforms with each other, and performing an inverse Fourier transform on the multiplied result to obtain a correlation, thereby judging, based on the calculated correlation, whether or not the arbitrary person is the specific individual.

48. An individual identification apparatus for judging whether or not an arbitrary individual is a specific individual, the apparatus comprising:

a reception portion for receiving a predetermined pattern of a specific individual as a reference pattern candidate and receiving a target pattern of an arbitrary individual desired to be identified as the specific individual; and a control portion comprising:

correlation calculation means capable of calculating a correlation between two patterns through performing a Fourier transform on two patterns, multiplying the Fourier transforms with each other, and performing an inverse Fourier transform on the multiplied result to thereby obtain a correlation;

reference storage judging means for allowing the reception portion to receive the reference pattern candidate and for controlling the correlation calculating means to calculate a correlation between the reference pattern candidate and a comparative pattern, thereby determining whether or not to record the reference pattern candidate, the comparative pattern including a corresponding pattern of an individual other than the specific individual;

reference storage means for recording the reference pattern candidate as a reference pattern when the reference storage judging means determines to record the reference pattern candidate and for refusing to record the reference pattern candidate as the reference pattern when the reference storage judging means determines not to record the reference pattern candidate; and identification judging means for allowing the reception portion to receive the target pattern and for controlling the correlation calculating means to calculate a correlation between the target pattern and the reference pattern, thereby judging whether or not the arbitrary person is the specific individual.

* * * * *